US011237386B2

United States Patent
Mueller et al.

(10) Patent No.: US 11,237,386 B2
(45) Date of Patent: Feb. 1, 2022

(54) SUBSTRATE PERFORATION SYSTEM AND METHOD USING POLYGON MIRROR(S)

(71) Applicant: ROHR, INC., Chula Vista, CA (US)

(72) Inventors: Arabella Mueller, Redlands, CA (US); Angel Cabrera, Fullerton, CA (US); Fassil Ghebremichael, Irvine, CA (US); Charles Novak, Perris, CA (US); Andrew Adan, Corona, CA (US); Dominic J. Elliott, Riverside, CA (US)

(73) Assignee: Rohr, Inc., Chula Vista, CA (US)

( * ) Notice: Subject to any disclaimer, the term of this patent is extended or adjusted under 35 U.S.C. 154(b) by 62 days.

(21) Appl. No.: 16/815,874

(22) Filed: Mar. 11, 2020

(65) Prior Publication Data
US 2021/0286172 A1    Sep. 16, 2021

(51) Int. Cl.
*G02B 26/12*    (2006.01)
*G02B 26/10*    (2006.01)
*G02B 5/09*    (2006.01)

(52) U.S. Cl.
CPC ......... *G02B 26/121* (2013.01); *G02B 26/101* (2013.01); *G02B 26/125* (2013.01); *G02B 5/09* (2013.01)

(58) Field of Classification Search
USPC .................................. 359/201.1, 201.2, 202.1
See application file for complete search history.

(56) References Cited

U.S. PATENT DOCUMENTS

| 4,129,355 A | * | 12/1978 | Noguchi | ................. | G02B 26/12 |
| | | | | | 359/201.1 |
| 4,318,582 A | * | 3/1982 | Minoura | ............... | G02B 26/101 |
| | | | | | 348/205 |
| 4,577,933 A | * | 3/1986 | Yip | ........................... | G02F 1/33 |
| | | | | | 348/198 |

(Continued)

FOREIGN PATENT DOCUMENTS

| JP | H11156567 | 6/1999 |
| JP | 2008298224 | 12/2008 |

(Continued)

OTHER PUBLICATIONS

European Patent Office, European Search Report dated Aug. 17, 2021 in Application No. 21161870.7.

*Primary Examiner* — Jennifer D. Carruth
(74) *Attorney, Agent, or Firm* — Snell & Wilmer L.L.P.

(57) ABSTRACT

Various arrangements and methods are disclosed for forming one or more perforations on a substrate surface using a laser system, at least one rotating polygon mirror, and at least one other movable mirror. A rotating polygon mirror may be used to define a plurality of perforations in a row set or band on a substrate surface by incrementing (e.g., moving) a first mirror between a plurality of fixed (e.g., pointing) positions. A rotating polygon mirror may be used to define a plurality of perforations in a row set or band on a substrate using a first mirror that is maintained in a fixed (e.g., pointing) position. A first rotating polygon mirror and a second rotating polygon mirror may be used to define a plurality of (Continued)

perforations in a row set or band on a substrate surface, where the first and second polygon mirrors are used to define an extent of a given perforation in two dimensions on the substrate.

20 Claims, 14 Drawing Sheets

(56) References Cited

U.S. PATENT DOCUMENTS

| | | | | |
|---|---|---|---|---|
| 4,733,072 | A * | 3/1988 | Lettington | G01S 7/4817 250/235 |
| 5,033,807 | A * | 7/1991 | Menke | G02B 5/09 359/216.1 |
| 5,392,149 | A * | 2/1995 | Boardman | G02B 26/125 250/236 |
| 5,557,438 | A * | 9/1996 | Schwartz | G02B 6/04 359/204.1 |
| 5,687,020 | A * | 11/1997 | Park | G02F 1/25 359/309 |
| 6,037,967 | A | 3/2000 | Allen et al. | |
| 6,720,524 | B1 * | 4/2004 | Hamada | B23K 26/082 219/121.7 |
| 9,522,426 | B2 | 12/2016 | Das et al. | |
| 2006/0039059 | A1 * | 2/2006 | Ji | G02B 26/0841 359/202.1 |
| 2009/0141327 | A1 * | 6/2009 | Penn | H04N 9/3117 359/201.1 |
| 2010/0039680 | A1 | 2/2010 | Yoon et al. | |
| 2015/0355327 | A1 * | 12/2015 | Goodwin | G01S 17/26 356/5.01 |
| 2017/0021455 | A1 | 1/2017 | Dallarosa et al. | |
| 2017/0036301 | A1 * | 2/2017 | Zhang | B23K 26/382 |
| 2017/0261743 | A1 * | 9/2017 | Kim | G05B 19/4099 |
| 2018/0369960 | A1 | 12/2018 | Ishikawa | |
| 2018/0369961 | A1 * | 12/2018 | Ishikawa | B33Y 10/00 |
| 2019/0310468 | A1 * | 10/2019 | Sapir | G01S 7/4817 |

FOREIGN PATENT DOCUMENTS

| | | |
|---|---|---|
| JP | 2014048575 | 3/2014 |
| WO | 2019005602 | 1/2019 |

* cited by examiner

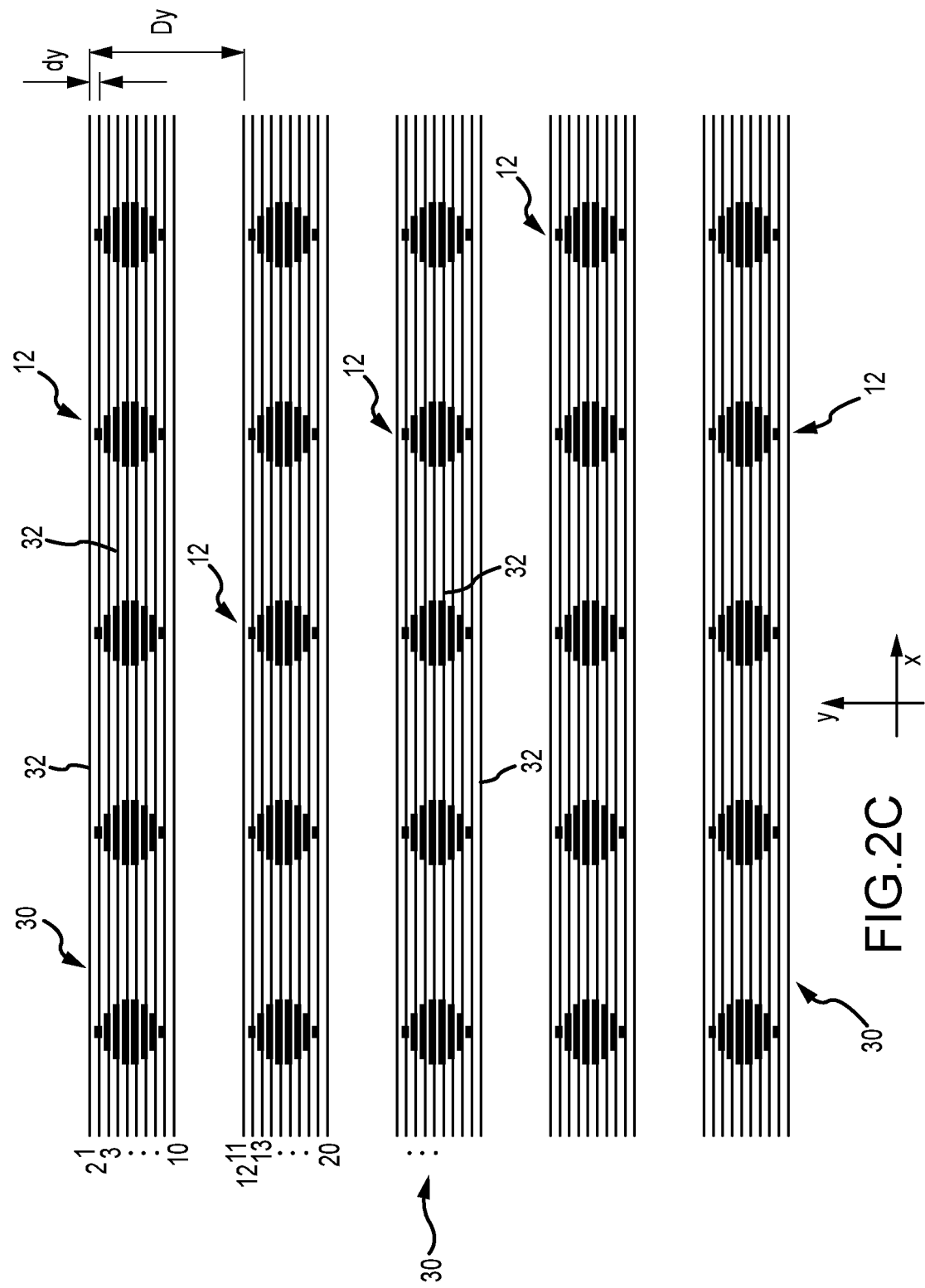

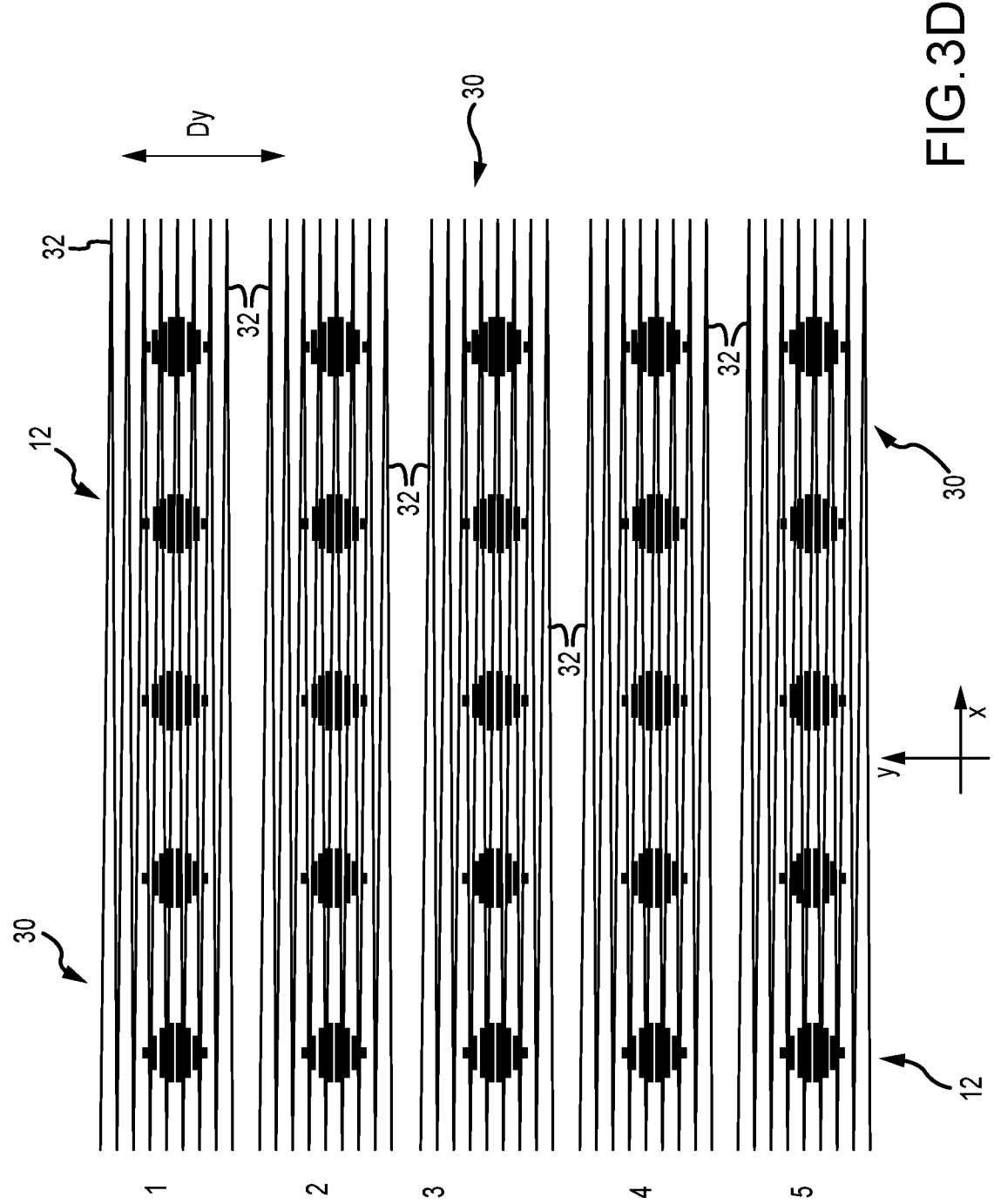

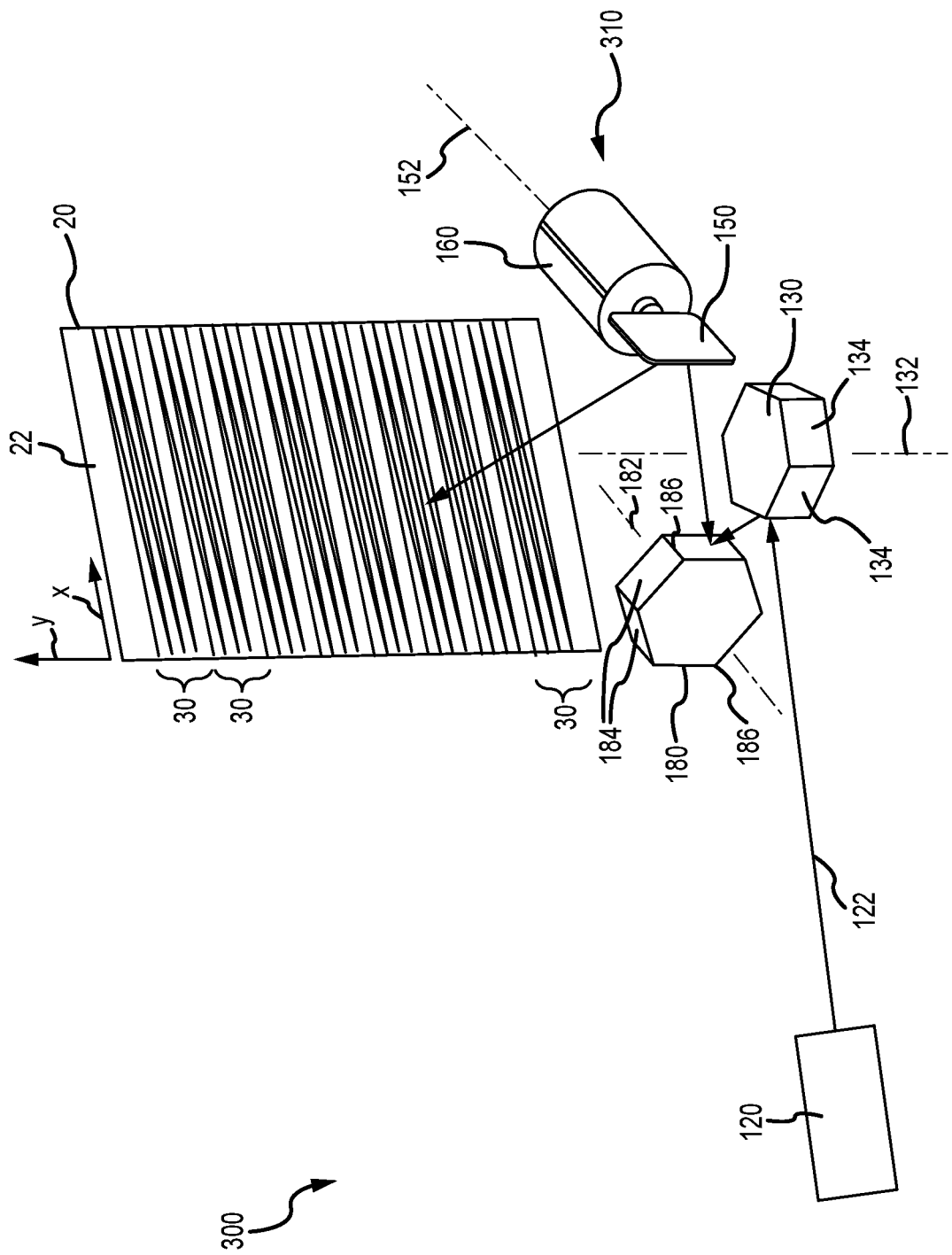

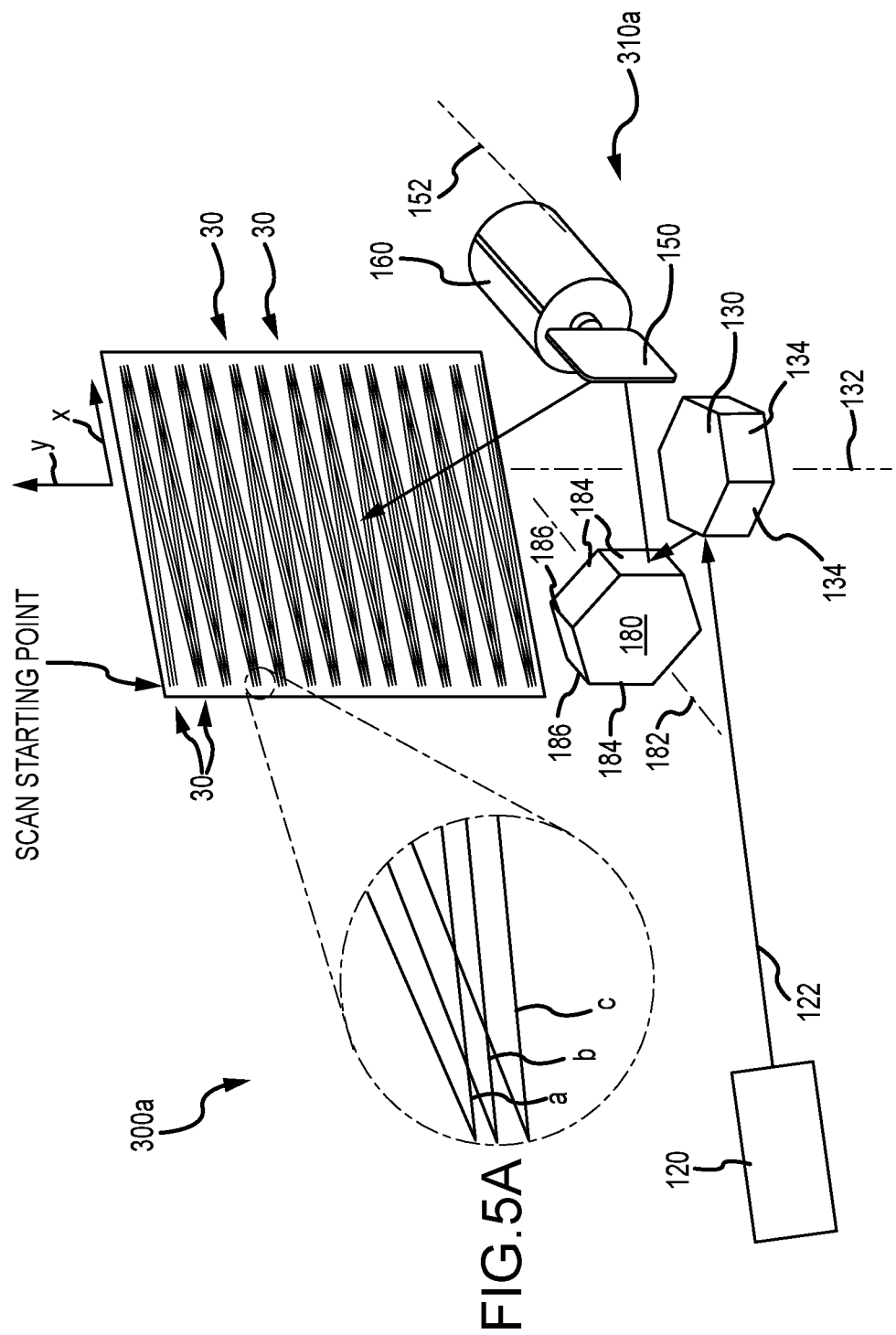

SUBSTRATE PERFORATION SYSTEM AND METHOD USING POLYGON MIRROR(S)

FIELD

The present disclosure generally relates to the field of processing substrates and, more particularly, to creating perforations in a substrate.

BACKGROUND

Prior technology with laser/scanner perforation on aerostructures materials utilizes a combination of n lasers in conjunction with a galvo-based x-y scanner. Although control of beam direction can be realized with the x-y scanners, it comes at speeds that are much slower than are desired for use in connection with aerostructure production. In a standard two galvanometer mirror system, the mirrors are commanded to some position and the laser is made to emit light. Although flexible in terms of pointing control in two planes, and adequate for many applications, this configuration yields a relatively slow process for creating perforations for aerostructures.

SUMMARY

A first aspect is embodied by creating one or more perforations on a substrate. A laser beam is output from a laser (e.g., one or more lasers may be utilized). A first polygon mirror includes a plurality of faces that are disposed on a perimeter of the first polygon mirror. The laser beam is reflected from a face of the rotating first polygon mirror. After being reflected by the first polygon mirror, the laser beam ultimately impacts a substrate to remove material from the substrate. The laser beam may be reflected from one or more faces of the first polygon mirror multiple times to ultimately define a first perforation on the substrate.

A number of feature refinements and additional features are applicable to the first aspect. These feature refinements and additional features may be used individually or in any combination. The following discussion is applicable to at least the first aspect. One or more perforations may be formed on the substrate for any appropriate purpose, such as for acoustics (dampening), aerodynamic drag (e.g., to improve laminar flow), surface conditioning (e.g., to enhance bonding; to enhance hydrophobic properties), cutting, trimming, welding, and the like. The substrate may be utilized as or by an aerostructure in one or more embodiments (e.g., a component of an airframe for aircraft, such as a fuselage, a wing, a flight control surface, inlet, engine duct, interiors, or the like).

The substrate may formed from any appropriate material or combination of materials, such as a composite, CFRP (carbon fiber reinforced polymer), CMC (ceramic matrix composite), GFRP (glass fiber reinforced polymer), metal, alloys, ceramics, or the like. The substrate may be of any appropriate configuration at the time when one or more perforations are formed on surface of the substrate, such as a plate or plate-like structure, a curved structure, a honeycomb structure, a film, or the like. The substrate may be of any appropriate thickness.

The first perforation may extend completely through a thickness of the substrate, or the first perforation may extend only partially through a thickness of the substrate to define a concave depression (e.g., the first perforation may be in the form of a blind hole in this instance). Multiple executions of the laser beam being reflected by one or more faces of the rotating first polygon mirror, and the subsequent impacting of the laser beam on the substrate, may be needed to one or more of: 1) define a desired depth of the first perforation in the substrate; 2) define a desired perimeter configuration for the first perforation; and 3) define a desired size for the first perforation. A first perforation of any desired perimeter configuration may be formed on the substrate, including without limitation circular, oval, square, rectangular, hexagonal, a line or slot, star-shaped, and the like. In various embodiments, each perforation that is formed on the substrate may be of any appropriate size. Incorporating multiple perforations on a substrate may define an open area of any appropriate magnitude. This open area is a ratio of an area of the surface of the substrate that is occupied by the various perforations, divided by an area of this surface of the substrate that is within an outer boundary of this surface that includes these perforations.

The laser may be of any appropriate type and/or configuration. An optical path may be characterized as extending from the laser to the substrate. One or more optical components may be disposed between the first polygon mirror and the substrate along this optical path. The first polygon mirror may be rotated by any appropriate drive source. In one or more embodiments, the first polygon mirror rotates at a constant rotational velocity throughout the definition of one or more perforations on the substrate by reflecting the laser beam to predetermined locations on the substrate. The laser beam may be pulsed from the laser, and furthermore timed to a rotational speed of the first polygon mirror, to define one or more perforations on the substrate that each have a predetermined perimeter configuration and that are each disposed on the substrate at a predetermined location. Each perforation that is formed in the substrate may be of a common configuration and size, although such may not be the case for one or more applications. A common perforation spacing may be used throughout the portion of the substrate in which perforations are formed, although such may not be the case for one or more applications.

A first plurality of perforations may be defined on the substrate by reflecting the laser beam from one or more faces of the rotating first polygon mirror, and may include the first perforation. Each perforation of the first plurality of perforations may be spaced from a remainder of the first plurality of perforations on the substrate. Any appropriate spacing may be utilized between the various perforations of the first plurality of perforations, including having a common spacing between each adjacent pair of perforations of the first plurality of perforations. Different sets of perforations of the first plurality of perforations may be disposed in different row sets on the substrate that each correspond with an x dimension of the substrate, where adjacent row sets on the substrate may be spaced from one another in a y dimension of the substrate. Herein, the x dimension and the y dimension of the substrate may be orthogonal to one another.

An optical system may be characterized as including the first polygon mirror and the laser. This optical system may be disposed in a first position where the above-noted first plurality of perforations are defined on the substrate. The optical system may be moved from this first position to a second position. A second plurality of perforations may be defined on the substrate by reflecting the laser beam from one or more faces of the rotating first polygon mirror and with the optical system remaining in the second position. The first plurality of perforations and the second plurality of perforations may be defined and/or formed on non-overlapping portions of the substrate. Each perforation of the second plurality of perforations may be spaced from a remainder of the second plurality of perforations on the substrate. Any appropriate spacing may be utilized between the various perforations of the second plurality of perforations, including having a common spacing between each adjacent pair of perforations of the second plurality of perforations. Different sets of perforations of the second plurality of perforations may be disposed in different rows sets on the substrate that each correspond with an x dimension of the substrate, where adjacent row sets on the substrate may be spaced from one another in a y dimension of the substrate.

In at least one embodiment, each face of the plurality of faces used by the first polygon mirror may be flat or planar, and furthermore may be disposed parallel to a rotational axis of the first polygon mirror. A first mirror may be disposed at any appropriate position along the noted optical path (e.g., disposed between the first polygon mirror and the substrate along the noted optical path), and this first mirror may be incrementally moved between a first plurality of fixed positions. In each fixed position of the first plurality of fixed positions for the first mirror, the first polygon mirror may be used to reflect the laser beam to impact the substrate at a plurality of positions on the substrate that are along a row that corresponds with an x dimension for the substrate. Disposing the first mirror in each of a plurality of fixed positions may be used to define one or more perforations on the substrate, including where multiple perforations are disposed along a row set defined by a plurality of the above-noted rows (e.g., each such row may correspond with a different, dedicated fixed position of the first mirror).

In at least one embodiment, each face of the plurality of faces used by the first polygon mirror may be flat or planar, and furthermore each such face may be disposed in a different orientation relative to a rotational axis of the first polygon mirror. Each face may correspond with a different row on the substrate that corresponds with the x dimension of the substrate. A first mirror may be disposed at any appropriate position along the noted optical oath (e.g., disposed between the first polygon mirror and the substrate along the noted optical path). This first mirror may be maintained in a first fixed position as reflections of the laser beam from the various faces of the first polygon mirror define the entirety of the first perforation in the substrate. Multiple first perforations may be formed on the substrate in a first row set, in spaced relation to one another, with this first mirror remaining in the noted first fixed position. The first mirror may be moved to a second fixed position to define one or more first perforations on the substrate in a second row set that is spaced from and parallel to the noted first row set, and while the first mirror is retained in this second fixed position.

A second polygon mirror may be used to define one or more perforations on the substrate. This second polygon mirror may include a plurality of faces that are disposed on a perimeter of the second polygon mirror. A first rotational axis of the first polygon mirror and a second rotational axis of the second polygon mirror may be disposed in different orientations relative to one another. The first polygon mirror may be used to define an extent of the one or more perforations in an x dimension of the substrate, while the second polygon mirror may be used to define an extent of one or more perforations in a y dimension of the substrate.

Various embodiments include using the above-noted first polygon mirror, the above-noted second polygon mirror, a movable first positioning mirror, and a moveable second positioning mirror. Each of the first polygon mirror, the second polygon mirror, the first positioning mirror, and the second positioning mirror may be disposed at any appropriate position along the optical path proceeding from the laser to the substrate. The first polygon mirror may be characterized as controlling formation of one or more perforations in at least a first dimension on the substrate (e.g., an x dimension). The second polygon mirror may be characterized as controlling formation of one or perforations in a second dimension (e.g., a y dimension) that is orthogonal to the first dimension. The movable second positioning mirror may be used to control formation of perforations in different quadrants relative to the first dimension (e.g., in a first quadrant and in a second quadrant that occupy different positions in the first dimension; in a third quadrant and in a fourth quadrant that occupy different positions in the first dimension). The movable first positioning mirror may be used to control formation of perforations in different quadrants relative to the second dimension (e.g., in a first quadrant and in a third quadrant that occupy different positions in the second dimension; in a second quadrant and in a fourth quadrant that occupy different positions in the second dimension). The first positioning mirror could also be used to control the formation of perforations in a given quadrant, but still in the noted second dimension.

The first polygon mirror may be characterized as controlling formation of one or more perforations in at least a first dimension on the substrate (e.g., an x dimension). Another mirror may be utilized to control formation of one or more perforations in a second dimension (e.g., a y dimension) that is orthogonal to the first dimension on the substrate. Such an additional mirror could be the above-noted first mirror, the second polygon mirror, or both. As discussed above, the first polygon mirror may be configured to control formation of one or more perforations in a common row in both the x and y dimensions (although the noted first mirror and/or second polygon mirror may be used to allow the first polygon mirror to form one or more perforations in a different row in such a case).

A second aspect is embodied by a perforation system that includes a movable base, a laser, a first polygon mirror, and a controller. The laser is mounted in a fixed position on the movable base, while the first polygon mirror is rotatably mounted on the movable base. The controller is configured to dispose the movable base in each of a plurality of fixed positions, and furthermore to operate the laser and rotate the first polygon mirror to define a plurality of perforations throughout a predetermined area of a substrate for each of the plurality of fixed positions for the movable base.

A number of feature refinements and additional features are applicable to the second aspect. These feature refinements and additional features may be used individually or in any combination. The following discussion is applicable to at least this second aspect. The second aspect may be utilized to execute the method associated with the first aspect, and as such the perforation system may include a second polygon mirror as discussed above in relation to the first aspect.

A third aspect is embodied by a method of processing a surface of an aerostructure. A laser beam is output from a laser. A first polygon mirror includes a plurality of faces that are disposed on a perimeter of the first polygon mirror. The laser beam is reflected from a face of the rotating first polygon mirror. The laser beam that is reflected by the first polygon mirror is used to define a plurality of perforations on a surface of the aerostructure.

A number of feature refinements and additional features are applicable to the third aspect. These feature refinements and additional features may be used individually or in any combination. The following discussion is applicable to at least this third aspect. Initially, the various features discussed above in relation to the first aspect may also be utilized by this third aspect. Representative materials for the aerostructure include without limitation the substrate materials noted above in relation to the first aspect. An open area of any appropriate magnitude may be defined by the perforations formed on the aerostructure.

Any feature of any other various aspects that is intended to be limited to a "singular" context or the like will be clearly set forth herein by terms such as "only," "single," "limited to," or the like. Merely introducing a feature in accordance with commonly accepted antecedent basis practice does not limit the corresponding feature to the singular (e.g., indicating that a substrate includes "a perforation" alone does not mean that the substrate includes only a single perforation). Moreover, any failure to use phrases such as "at least one" also does not limit the corresponding feature to the singular (e.g., indicating that a substrate includes "a perforation" alone does not mean that the substrate includes only a single perforation). Use of the phrase "at least generally" or the like in relation to a particular feature encompasses the corresponding characteristic and insubstantial variations thereof (e.g., indicating that a perforation is at least generally circular encompasses the perforation being circular). Finally, a reference of a feature in conjunction with the phrase "in one embodiment" does not limit the use of the feature to a single embodiment.

Various aspects are also addressed by the following paragraphs and in the noted combinations:

In one embodiment, a method for creating a perforation in a substrate, comprising:
directing a laser beam from a laser;
rotating a first polygon mirror comprising a plurality of faces that are disposed on a perimeter of said first polygon mirror;
reflecting said laser beam from a face of said plurality of faces;
removing material from a substrate, after said reflecting step, by impacting said laser beam on said substrate; and
repeating said reflecting and removing steps a plurality of times to define a first perforation in said substrate.

In another embodiment, said first perforation extends completely through a thickness of said substrate.

In another embodiment, said first perforation extends only partially through a thickness of said substrate to define a concave depression on said substrate.

In another embodiment, multiple executions of said reflecting and removing steps are required to define a desired depth of said first perforation.

In another embodiment, multiple executions of said reflecting and removing steps are required to define a desired perimeter configuration of said first perforation.

In another embodiment, multiple executions of said reflecting and removing steps are required to define both a desired depth of said first perforation and a desired perimeter configuration of said first perforation.

In another embodiment, said rotating step comprises continually rotating said polygon mirror at a constant rotational velocity throughout said repeating step.

In another embodiment, further comprising:
defining a first plurality of perforations on said substrate using said repeating step, wherein each perforation of said first plurality of perforations is spaced from a remainder of said first plurality of perforations, and wherein said first plurality of perforations comprises said first perforation.

In another embodiment, different portions of said first plurality of perforations are disposed in different row sets on said substrate that correspond with an x dimension of said substrate, and wherein adjacent row sets on said substrate are spaced from one another in a y dimension.

In another embodiment, further comprising:
moving an optical system from a first position to a second position, wherein said optical system comprises said first polygon mirror and said laser, and wherein said optical system is in said first position for said defining a first plurality of perforations step; and
defining a second plurality of perforations on said substrate using said repeating step, wherein each perforation of said second plurality of perforations is spaced from a remainder of said second plurality of perforations, wherein said first plurality of perforations and said second plurality of perforations are defined in non-overlapping portions of said substrate, and wherein said optical system is in said second position for said defining a second plurality of perforations step.

In another embodiment, a movable mirror and said first polygon mirror are in an optical path proceeding from said laser to said substrate, wherein said first polygon mirror defines said plurality of perforations in at least a first dimension and said movable mirror defines at least part of at least some of said plurality of perforations in a second dimension that is orthogonal to said first dimension.

In another embodiment, said substrate comprises an aerostructure.

In another embodiment, each said face of said plurality of faces is a planar surface and is parallel to a rotational axis of said first polygon mirror.

In another embodiment, further comprising:
executing a first repeating step comprising repeating said reflecting and removing steps a plurality of times at spaced locations in each of a first plurality of rows that each correspond with an x dimension of said substrate, wherein each row of said first plurality of rows are spaced from one another in a y dimension of said substrate, wherein said first plurality of rows define a first row set, and wherein a plurality of said first perforations are defined in said first row set and are spaced from one another along said first row set.

In another embodiment, further comprising incrementally moving a first mirror between a first plurality of fixed positions, wherein each fixed position of said first plurality of fixed positions corresponds with a different said row of said first row set.

In another embodiment, further comprising:
executing a second repeating step comprising repeating said reflecting and removing steps a plurality of times at spaced locations in each of a second plurality of rows that each correspond with said x dimension of said substrate, wherein each row of second said plurality of rows are spaced from one another in said y dimension of said substrate, wherein said second plurality of rows define a second row set that is spaced from said first row set in said y dimension, and wherein a plurality of said first perforations are defined in said second row set and are spaced from one another along said second row set.

In another embodiment, further comprising incrementally moving said first mirror between a second plurality of fixed positions that are each different from said first plurality of fixed positions, wherein each fixed position of said second plurality of fixed positions corresponds with a different said row of said second row set.

In another embodiment, said first mirror is disposed between said laser and said first polygon mirror along an optical path proceeding from said laser to said substrate.

In another embodiment, each said face of said plurality of faces is a planar surface and is disposed at a different angle relative to a rotational axis of said first polygon mirror.

In another embodiment, said reflecting step is executed in relation to each of said plurality of faces to define an entirety of said first perforation.

In another embodiment, further comprising:

executing a first repeating step comprising repeating said reflecting and removing steps a plurality of times at spaced locations along a row set that corresponds with an x dimension of said substrate, wherein a plurality of said first perforations are defined in said row set and are spaced from one another within said row set.

In another embodiment, further comprising maintaining a first mirror in a first fixed position until completion of said first perforation, wherein said first mirror is disposed in an optical path proceeding from said laser to said substrate.

In another embodiment, further comprising:

incrementing said first mirror to a second fixed position; and repeating said reflecting and removing steps a plurality of times to define a second perforation in said substrate and with said first mirror remaining in said second fixed position, wherein said first and second perforations are spaced from one another in a y dimension of said substrate.

In another embodiment, further comprising the steps of:

rotating a second polygon mirror comprising a plurality of faces that are disposed on a perimeter of said second polygon mirror;

wherein said first polygon mirror comprises a first rotational axis, wherein said second polygon mirror comprises a second rotational axis, and wherein said first rotational axis is disposed in a different orientation than said second rotational axis.

In another embodiment, said second polygon mirror is disposed in an optical path proceeding from said laser to said substrate.

In another embodiment, said first polygon mirror is used to define an extent of said first perforation in an x dimension of said substrate, and wherein said second polygon mirror is used to define an extent of said first perforation in a y dimension of said substrate.

In another embodiment, said first polygon mirror rotates at a higher rotational speed than said second polygon mirror.

In another embodiment, a number of said faces of said first polygon mirror is the same as a number of said faces of said second polygon mirror.

In another embodiment, a number of said faces of said first polygon mirror is different from a number of said faces of said second polygon mirror.

In another embodiment, said first polygon mirror and said second polygon mirror rotate at a common rotational speed.

In another embodiment, said repeating step comprises impacting said laser beam on each of a plurality of different locations along a row set that extends in an x dimension of said substrate and that defines a plurality of said first perforations within said row set that are spaced from one another in said x dimension.

In another embodiment, said repeating step comprises impacting said laser beam on each of a plurality of different locations within each row of each row set of a plurality of row sets, said method further comprising:

defining a plurality of said first perforations in each said row set using said repeating step.

In another embodiment, all of said plurality of first perforations in a given said row set are defined prior to initiating execution of said defining step in a different said row set.

In another embodiment, further comprising:

incrementally moving a first mirror between a plurality of fixed positions, wherein each fixed position of said plurality of fixed positions corresponds with a different said row set of said plurality of row sets.

In another embodiment, said first mirror is located between said second polygon mirror and said substrate along an optical path proceeding from said laser to said substrate, and wherein said second polygon mirror is located between said first mirror and said first polygon mirror along said optical path.

In another embodiment, said defining a plurality of said first perforations comprises:

a first sequencing step comprising sequencing said laser beam a single time through each said row set of said plurality of row sets to impact a first plurality of different locations within each said row set; and executing a second sequencing step after said first sequencing step, and comprising sequencing said laser beam a single time through each said row set of said plurality of row sets to impact a second plurality of different locations within each said row set.

In another embodiment, further comprising:

incrementally moving a first mirror between first and second fixed positions, wherein said first mirror is in said first fixed position for said first sequencing step, and wherein said first mirror is in said second fixed position for said second sequencing step.

In another embodiment, said first mirror is located between said second polygon mirror and said substrate along an optical path proceeding from said laser to said substrate, and wherein said second polygon mirror is located between said first mirror and said first polygon mirror along said optical path.

In another embodiment, said second polygon mirror controls an impact location of said laser beam on said substrate in a y dimension, and wherein said first polygon mirror controls said impact location of said laser beam on said substrate in an x dimension.

In another embodiment, further comprising using said substrate as an aerostructure.

In another embodiment, further comprising using said method to acoustically treat said substrate.

In another embodiment, further comprising using said method to address aerodynamic drag on said substrate.

In another embodiment, said x dimension is orthogonal to said y dimension.

In one embodiment, a perforation system, comprising:

a movable base;

a laser mounted in a fixed position on said movable base;

a first polygon mirror rotatably mounted on said movable base; and a controller configured:

to dispose said movable base in a plurality of fixed positions; and to operate said laser and to rotate said first polygon mirror at a fixed rotational speed to define a plurality of perforations throughout a predetermined area of a substrate for each of said plurality of fixed positions of said movable base.

In another embodiment, said perforation system is configured to execute the above-described method In another embodiment, further comprising a first mirror mounted on said movable base.

In another embodiment, further comprising a second polygon mirror rotatably mounted on said movable base and a first mirror mounted on said movable base.

In another embodiment, said first polygon mirror is disposed between said laser and second polygon mirror along an optical path.

BRIEF DESCRIPTION OF THE FIGURES

FIG. 2C shows a representative scanning configuration for forming at least generally circular perforations on a substrate using the perforation system of FIG. 2A;

FIG. 3D shows a representative scanning configuration for forming at least generally circular perforations on a substrate using the perforation system of FIG. 3A;

FIG. 4 illustrates a perforation system that utilizes an optical system having rotatable polygon mirrors and a first mirror that operates in a first operational mode to define a plurality of perforations on a substrate;

FIG. 5 illustrates a perforation system that utilizes an optical system having rotatable polygon mirrors and a first mirror that operates in a second operational mode to define a plurality of perforations on a substrate (FIG. 5A being an enlargement of the noted portion of FIG. 5);

DETAILED DESCRIPTION

Figure 1A:
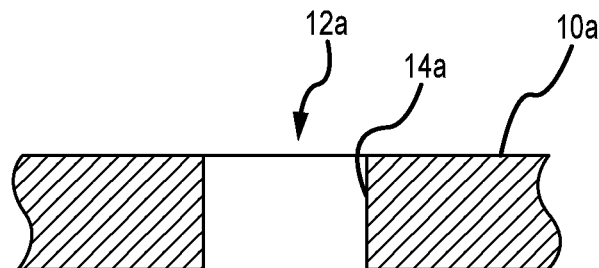
FIG. 1A is a cross-sectional view of a substrate with a perforation in the form of a through-hole.
Figure 1B:
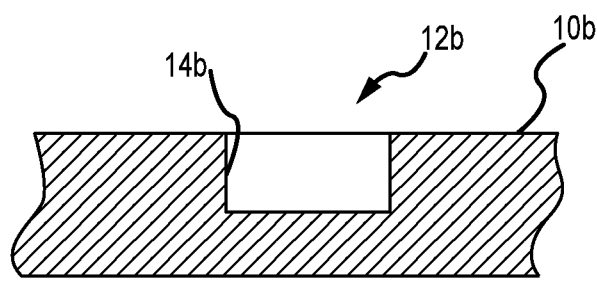
FIG. 1B is a cross-sectional view of a substrate with a perforation in the form of a recess or blind hole.
Figure 1C:
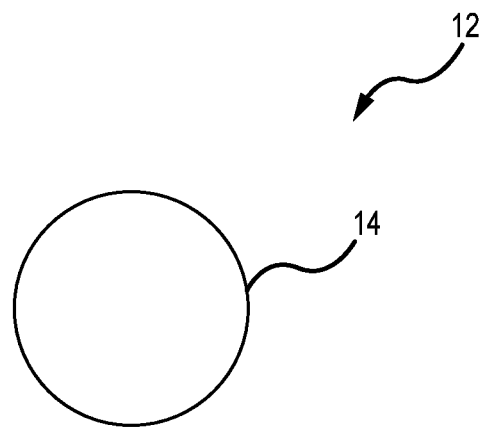
FIG. 1C is a plan view of representative perforation with a circular perimeter or perimeter configuration.

Various embodiments of perforation systems are disclosed herein that may be configured/operated to form one or more perforations on a substrate of any appropriate configuration (e.g., substrate in the form of a plate or plate-like structure; a substrate in the form of a curved structure), on a substrate formed from any appropriate material or combination of materials (e.g., a composite, CFRP (carbon fiber reinforced polymer), CMC (ceramic matrix composite), GFRP (glass fiber reinforced polymer), metal, alloys, ceramics), and including all combinations thereof. These perforations may be of any desired perimeter configuration (e.g., a shape or profile of the perforation in a plan view) and/or size. FIG. 1A illustrates a substrate 10a having such a perforation 12a in the form of a through-hole (i.e., the perforation 12a extends completely through the substrate 10a), where this perforation 12a has a perimeter 14a that defines the perimeter configuration of the perforation 12a. FIG. 1B illustrates a substrate 10b having such a perforation 12b in the form of a recess or blind hole (i.e., the perforation 12b fails to extend completely through the substrate 10b, so the perforation 12b instead defines a concave recess on a surface of the substrate 10b), where this perforation 12b has a perimeter 14b that defines the perimeter configuration of the perforation 12b. FIG. 1C is a plan view of a perforation 12 having a circular perimeter 14, and that may be utilized for the perforation 12a of FIG. 1A or the perforation 12b of FIG. 1B.

Figure 1D:
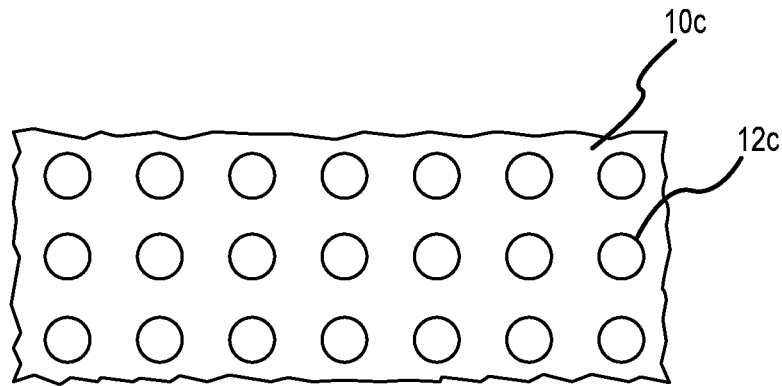
FIG. 1D is a plan view of a portion of a substrate with a plurality of perforations of one representative perimeter configuration or perforation profile.
Figure 1E:
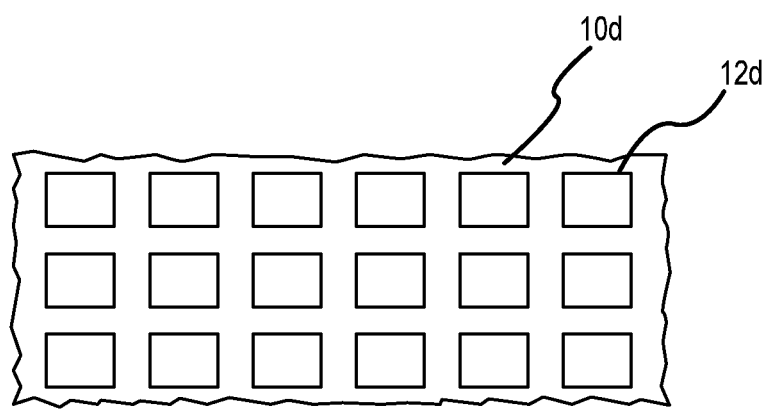
FIG. 1E is a plan view of a portion of a substrate with a plurality of perforations of another representative perimeter configuration or perforation profile.

The embodiments of perforation systems disclosed herein may be configured/operated to form any appropriate number of perforations on a substrate, in any appropriate layout/arrangement, and with any appropriate spacing between adjacent pairs of perforations. Representative layouts/arrangements of perforations that may be formed by the embodiments of perforation systems disclosed herein are illustrated in FIGS. 1D and 1E. The substrate 10c of FIG. 1D includes a plurality of circular perforations 12c that are disposed in a plurality of rows that are spaced from one another. The substrate 10d of FIG. 1E includes a plurality of square perforations 12d that are disposed in a plurality of rows that are spaced from one another. Any appropriate spacing between adjacent pairs of perforations in a given row may be utilized, including a common spacing between adjacent pairs of perforations throughout a given row. The same or a different spacing between adjacent pairs of perforations may be utilized in one or more rows.

Perforations formed by any of the embodiments of perforation systems disclosed herein may provide any appropriate function or combination of functions. Representative functions for these perforations on a surface of a substrate include without limitation addressing acoustics (dampening) (the addition of perforations to a surface of a substrate may be characterized as an acoustic treatment of the substrate), addressing aerodynamic drag (e.g., improving laminar flow), surface conditioning (e.g., to enhance bonding, to enhance hydrophobic properties), cutting, trimming, welding, and the like. One application for the embodiments of perforation systems disclosed herein is to create perforations on a substrate that is used as an aerostructure (e.g., a component of an airframe for an aircraft; an exterior surface of an aerostructure).

Figure 2A:
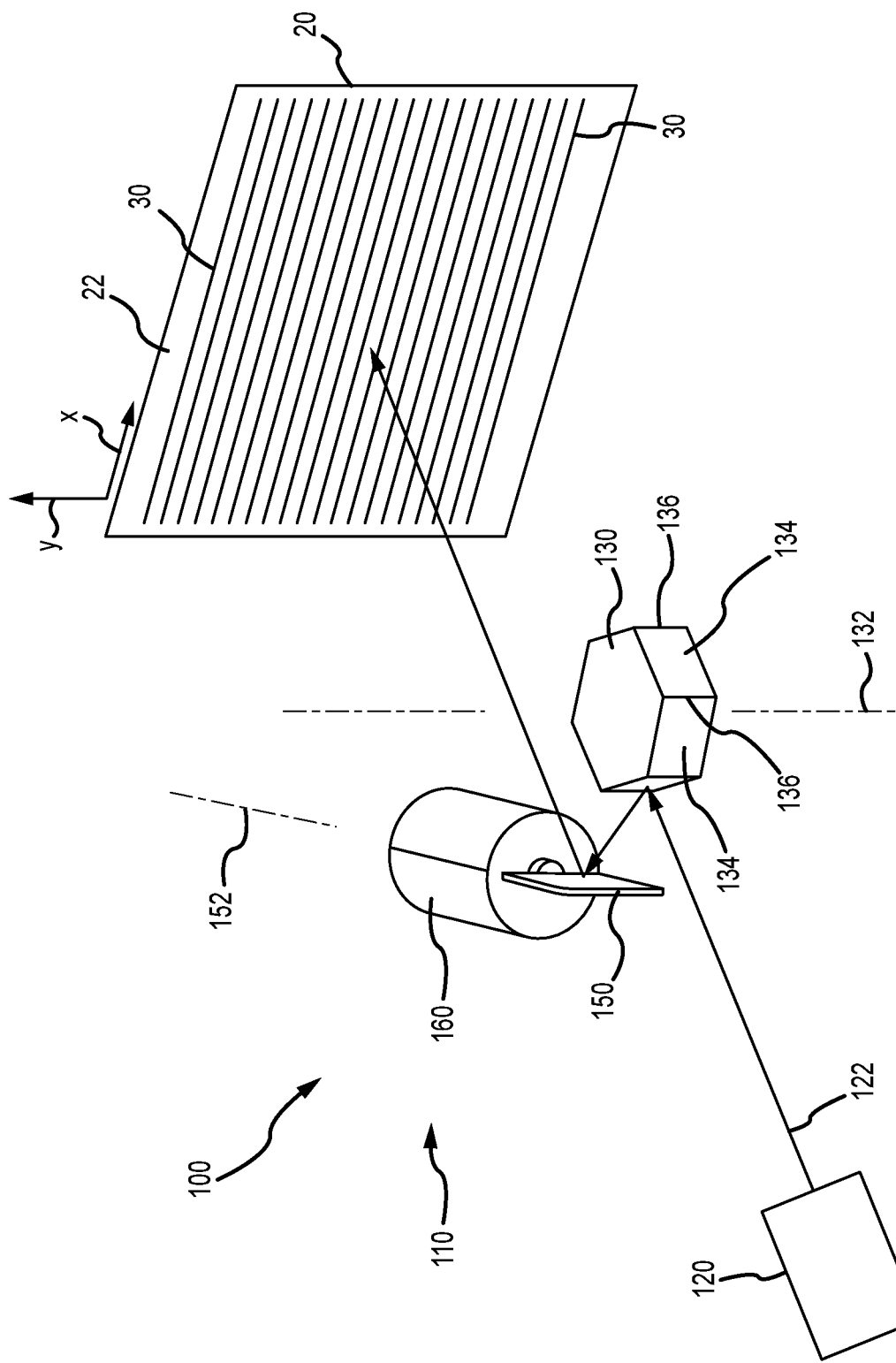
FIG. 2A is a schematic of a perforation system that utilizes an optical system having a rotatable polygon mirror to define a plurality of perforations on a substrate.

A perforation system in accordance with various embodiments is illustrated in FIG. 2A, is identified by reference numeral 100, and is configured/operated to form a plurality of perforations of a predetermined perimeter configuration and size on a surface 22 of a substrate 20 in accordance with the foregoing. The perforation system 100 may be characterized as including an optical system 110. Components of this optical system 110 include a laser 120, a first polygon mirror 130, and a mirror 150.

The laser 120 may be of any appropriate type/configuration, of any appropriate pulse repetition rate, pulse width, power, and wavelength (e.g., YAG; 100 kHz, 10 ns, 100 W, 1064 nm), and generates a laser beam 122 that proceeds along an optical path to the substrate 20. The laser beam 122 may be output by the laser 120 in the form of a pulse that is issued at any appropriate frequency (e.g., a fixed frequency). One or more embodiments has the position of the laser 120 being fixed relative to the first polygon mirror 130—more specifically the position of the laser 120 may be fixed relative to the position of a rotational axis 132 of the first polygon mirror 130. The impacting of the laser beam 122 on the surface 22 of the substrate 20 removes corresponding material from the substrate 20 (e.g., via ablation, vaporization, or the like of the material defining the substrate 20).

The first polygon mirror 130 may be disposed between the laser 120 and the mirror 150 along the optical path of the laser beam 122 proceeding from the laser 120 to the substrate 20, although both the first polygon mirror 130 and the 150 mirror may be disposed at any appropriate position along the noted optical path. Operation of the perforation system 100 may include continuously rotating the first polygon mirror 130 at a constant rotational velocity about its rotational axis 132 (e.g., an appropriate rotational drive may be interconnected with the first polygon mirror 130). A plurality of faces 134 are disposed on a perimeter of the first polygon mirror 130. Any appropriate number of faces 134 may be disposed on the perimeter of the first polygon mirror 130 (six in the illustrated embodiment). Each of these faces 134 are flat or planar surfaces in one or more embodiments. Moreover, these faces 134 are each disposed at least substantially parallel to the rotational axis 132 of the first polygon mirror 130 for the case of the perforation system 100. As such, a vector 140 that is normal to its corresponding face 134 is parallel to or colinear with the same vector 140 of each other face 134 of the first polygon mirror 130 when disposed in the same rotational or angular position relative to the rotational axis 132.

Figure 2B:
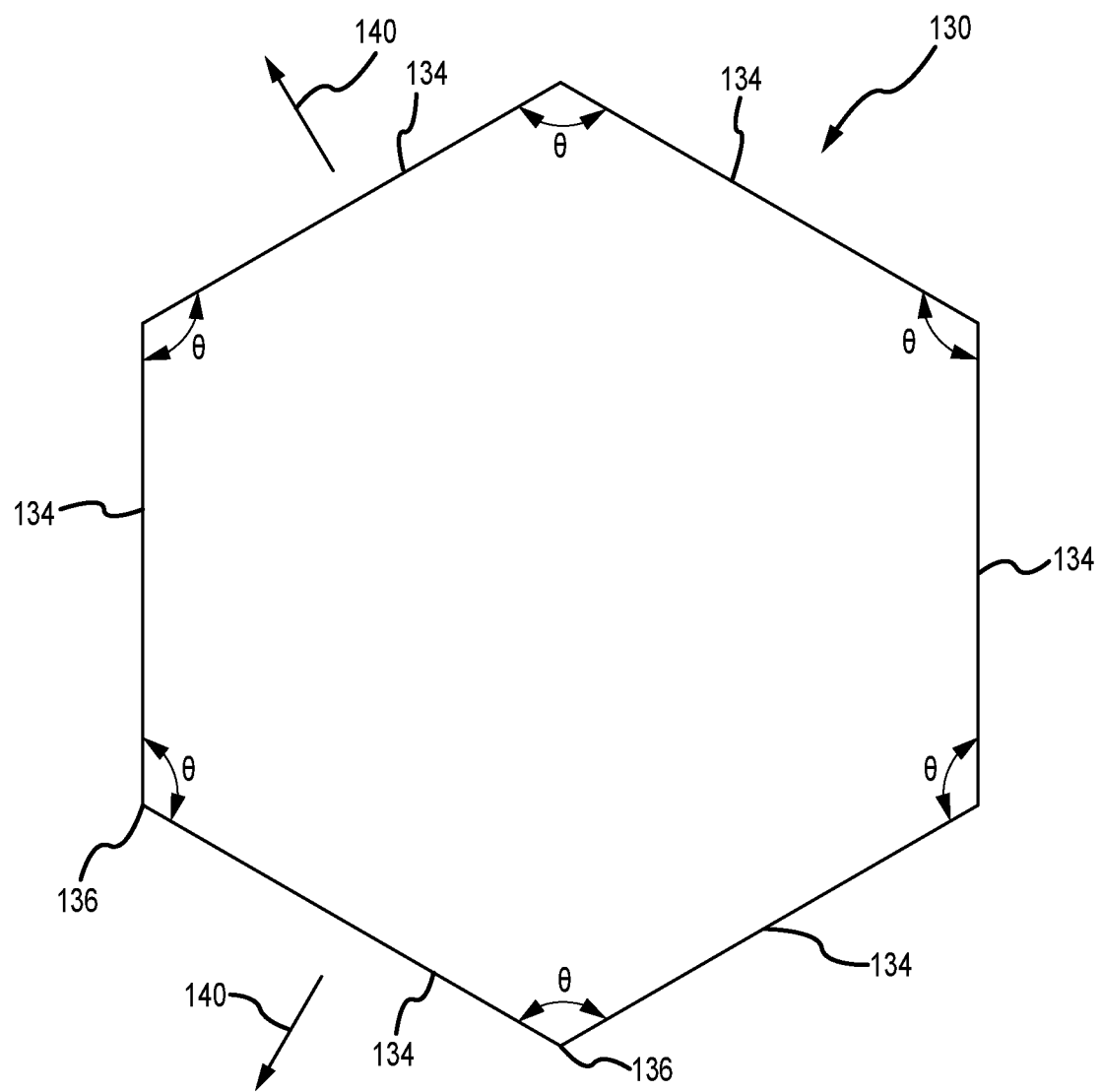
FIG. 2B is a top view of the polygon mirror used by the perforation system of FIG. 2A.

A common included angle θ exists between each adjacent pair of faces 134 of the first polygon mirror 130 (e.g., FIG. 2B). Although adjacent faces 134 may intersect along a line, any appropriate transition may be used between each adjacent pair of faces 134 (e.g., a chamfer; a rounded or convex transition surface). Where the laser beam 122 impacts a given face 134 between its corresponding pair of ends 136 (the spacing between a pair of adjacent ends 136 may be referred to as defining a length dimension of the corresponding face 134) will determine where the laser beam 122 impacts the surface 22 of the substrate 20 in the x dimension noted in FIG. 2A.

The mirror 150 may be disposed between the first polygon mirror 130 and the substrate 20 along the optical path of the laser beam 122 proceeding from the laser 120 to the substrate 20, but again the mirror 150 may be disposed at any appropriate position along the noted optical path. The position of the mirror 150 is controlled by a drive 160 (e.g., a servomotor or a galvanometer) that rotates the mirror 150 about a rotational axis 152. The mirror 150 may be referred to as a galvanometer mirror or scanner 150. In any case, the position of the mirror 150 controls where the laser beam 122 impacts the surface 22 of the substrate 20 in the y dimension noted in FIG. 2A. One or more other optical components may be located along the optical path between the mirror 150 and the substrate 20, for instance such that the laser beam 122 impacts the substrate 20 normal to its surface 22.

Operation of the perforation system 100 will be addressed with regard to FIGS. 2A and 2C. FIG. 2A shows a plurality of row sets 30 that extend in the x dimension and that are spaced from one another in they dimension (e.g., the plurality of row sets 30 may be disposed in parallel relation to one another). Each row set 30 may be characterized as including a plurality of rows 32 that also extend in the x dimension and that are spaced from one another in the y dimension (e.g., the plurality of rows 32 may be disposed in parallel relation to one another). Generally and as shown in FIG. 2C, the laser 120 may be activated such that its laser beam 122 impacts the surface 22 of the substrate 20 at each of the locations shown in FIG. 2C to define a plurality of perforations 12 in each row set 30, where each of these perforations 12 will ultimately have a predetermined perimeter configuration, and where the perforations 12 in each row set 30 are spaced from one another in any appropriate fashion (e.g., an equally spaced relation within the given row set 30).

Generally, the mirror 150 may be moved to a fixed position where the laser beam 122 will impact the surface 22 of the substrate 20 along one of the rows 32 (or between an adjacent pair of rows 32) of a particular row set 30. The laser 120 will be pulsed such that it impacts the surface 22 of the substrate 20 at predetermined locations along the given row 32 (or in the x dimension) to define a corresponding portion of each of the perforations 12, and that is achieved by the laser beam 122 being reflected from a face 134 of the first polygon mirror 130 as it is being rotated at a constant rotational speed about its rotational axis 132. Again, the location of where the laser beam 122 impacts a face 134 of the first polygon mirror 130 (e.g., where the laser beam 122 impacts a face 134 along its length dimension), determines where the laser beam 122 impacts the surface 22 of the substrate 20 in the x dimension. The mirror 150 may be incremented between a number of different fixed positions such that the laser beam 122 will impact the surface 22 of the substrate 20 along each of the rows 32 (or between each of the rows 32) of a particular row set 30 to define each of the desired perforations 12 in this row set 30 and where each perforation 12 will ultimately have a predetermined perimeter configuration.

One way in which the perforations 12 shown in FIG. 2C may be produced will be summarized. The mirror 150 may be positioned such that the laser beam 122 will impact the surface 22 of the substrate 20 on the second row 32 (the second down from the top in the view of FIG. 2C) of the upper row set 30 in the view of FIG. 2C. With the mirror 150 remaining in this fixed position, the laser 120 may be pulsed and reflected by one or more faces 134 of the rotating first polygon mirror 130 to impact the surface 22 of the substrate 20 at the locations shown in FIG. 2C (these locations being spaced from one another in the x dimension but occupying the same position in the y dimension). This may need to be repeated a plurality of times in order for each of the perforations 12 to extend to the desired depth within the substrate 20 (including for a given perforation 12 to extend through the entire thickness of the substrate 20). Thereafter, the mirror 150 may be incremented/moved to a position where the laser beam 122 will impact the surface 22 of the substrate 20 on the next row 32 proceeding in the y dimension (e.g., to another location in they dimension). With the mirror 150 remaining in this new fixed position, again the laser 120 may be pulsed and reflected by one or more faces 134 of the rotating first polygon mirror 130 to impact the surface 22 of the substrate 20 at the locations shown in FIG. 2C (these locations being spaced from one another in the x dimension but occupying the same position in the y dimension). This may be repeated until each of the perforations 12 in the row set 30 have been defined, and also may be repeated for each row set 30 in which one or more perforations 12 are to be defined.

Based upon the foregoing, it should be appreciated that the mirror 150 is moved in increments dy to form the desired perforations 12 in a particular row set 30, and is moved in a larger increment Dy to move from one row set 30 to an adjacent row set 30. Although the perforation system 100 may be operated to scan or sequence in a top-to-down fashion in the view shown in FIG. 2C, and where the entire depth of each perforation in a given row 32 may be defined prior to proceeding to the next row 32 in the same row set 30 (or more generally to another location in the y dimension), other operational configurations may be utilized. For instance, perforations 12 may be partially defined in each row 32 of a given row set 30, although this would require more incremental movements of the mirror 150 (e.g., ½ of the desired perforation depth for each perforation 12 in a given row set 30 may be defined by a first set of incremental movements of the mirror 150, and this may then be repeated to define the remainder of the desired perforation depth for each perforation in this same row set 30), and this may apply to each row set 30.

Figure 3A:
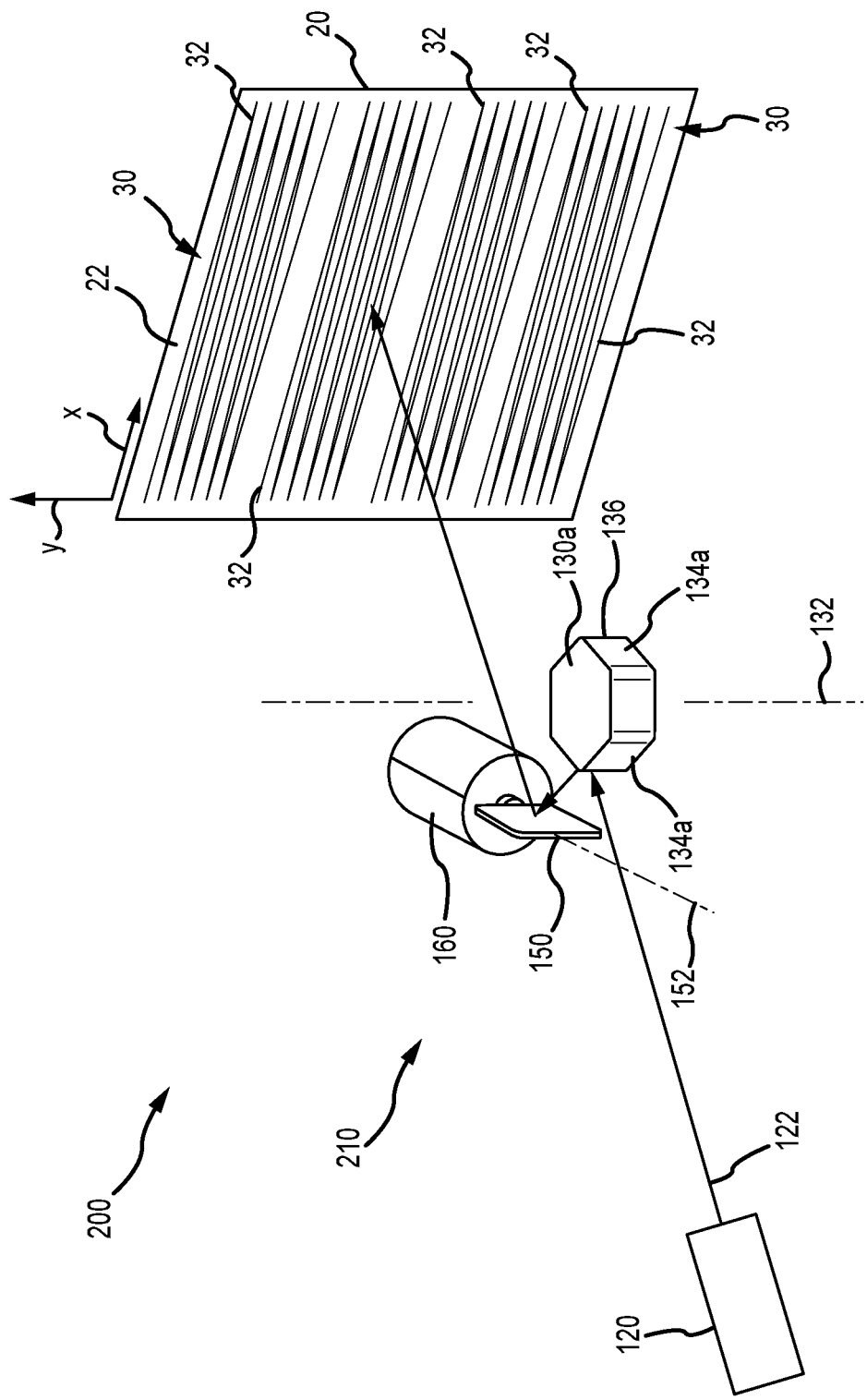
FIG. 3A is a schematic of a perforation system that utilizes an optical system having a rotatable polygon mirror to define a plurality of perforations on a substrate.

A perforation system in accordance with various embodiments is illustrated in FIG. 3A, is identified by reference numeral 200, and is configured/operated to form a plurality of perforations of a predetermined perimeter configuration and size on a surface 22 of a substrate 20 in accordance with the foregoing. Corresponding components between the perforation system 100 of FIG. 2A and the perforation system 200 of FIG. 3A are identified by the same reference numeral and the corresponding discussion above remains applicable to the perforation system 200 unless otherwise noted.

Figure 3B:
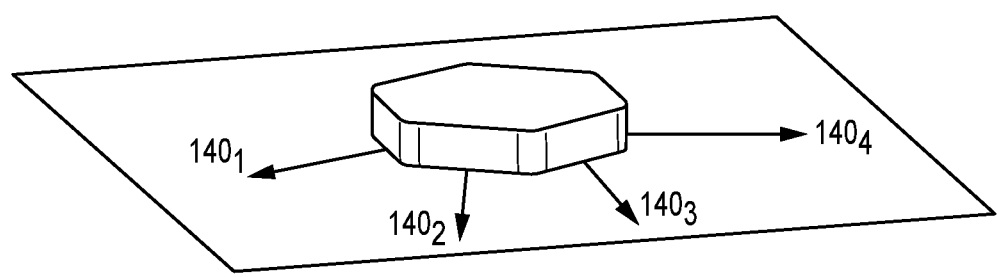
FIG. 3B is a perspective view of the polygon mirror used by the perforation system of FIG. 3A, and illustrating each of the faces of the polygon mirror having normal vectors that are disposed in different orientations when disposed in the same rotational/angular position.

The perforation system 200 may be characterized as including an optical system 210. Components of this optical system 210 include the laser 120, a first polygon mirror 130a, and the mirror 150. The first polygon mirror 130a is disposed between the laser 120 and the mirror 150 along the optical path of the laser beam 122 proceeding from the laser 120 to the substrate 20, although both the first polygon mirror 130a and the mirror 150 may be disposed at any appropriate position along the noted optical path. Operation of the perforation system 200 may include continuously rotating the first polygon mirror 130a at a constant rotational velocity about its rotational axis 132. A plurality of faces 134a are disposed on a perimeter of the first polygon mirror 130a. Any appropriate number of faces 134a may be disposed on the perimeter of the first polygon mirror 130a (six in the illustrated embodiment). Each of these faces 134a are flat or planar surfaces in one or more embodiments. Unlike the case of the perforation system 100 discussed above, these faces 134a are each disposed in a different orientation relative to the rotational axis 132 of the first polygon mirror 130a and as shown in FIG. 3B.

Figure 3C:
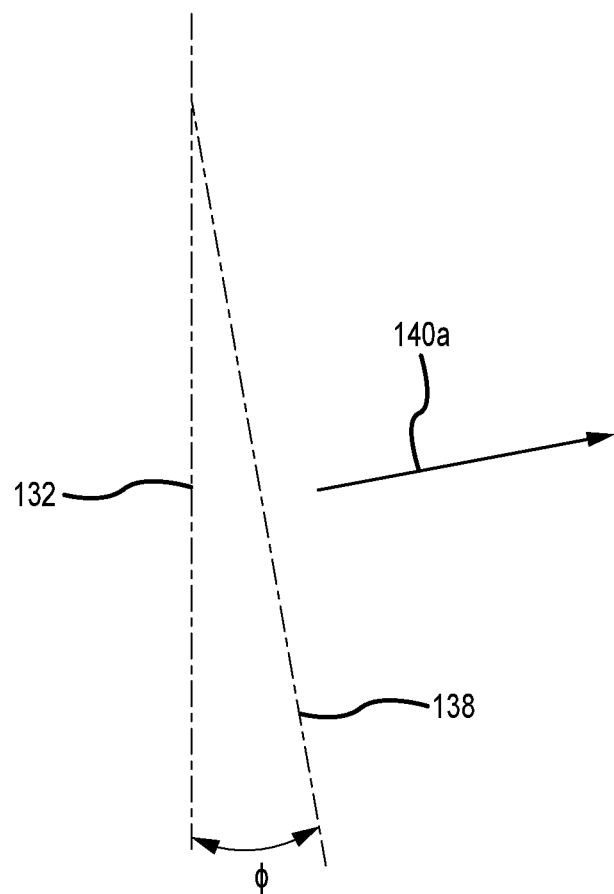
FIG. 3C is a schematic that illustrates an included angle between a rotational axis of the polygon mirror used by the perforation system of FIG. 3A and a vector that is normal to one of its faces.

FIG. 3C shows the orientation of the rotational axis 132 of the first polygon mirror 130a, along with a reference plane 138 that corresponds with one of the faces 134a. As such, a vector 140a that is orthogonal to this face 134a is disposed in an orientation other than perpendicular to the rotational axis 132 of the first polygon mirror 130a. Stated another way, there is an included angle Φ between the rotational axis 132 and the reference plane 138, and this included angle Φ may be any appropriate value that is greater that 0°. Based upon the different orientation of each face 134a of the first polygon mirror 130a, the vector 140a will be in a different orientation for each of the faces 134a of the first polygon mirror 130a when in the same rotational or angular position relative to the rotational axis 132 (see FIG. 3B).

Although adjacent faces 134a of the first polygon mirror 130a may intersect along a line, any appropriate transition may be used between each adjacent pair of faces 134a (e.g., a chamfer; a rounded or convex transition surface). Again, where the laser beam 122 impacts a given face 134a between its corresponding pair of ends 136 (or along the length dimension of such a face 134a) will determine where the laser beam 122 impacts the surface 22 of the substrate 20 in the x dimension noted in FIG. 3A.

The position of the mirror 150 again is controlled by the drive 160. Generally, the position of the mirror 150 at least partially controls where the laser beam 122 impacts the surface 22 of the substrate 20 in the y dimension noted in FIG. 3A. However, the different orientations of the faces 134a of the first polygon mirror 130 also controls where the laser beam 122 impacts the surface 22 of the substrate 20 in the y dimension noted in FIG. 3A. One or more other optical components may be located along the optical path between the mirror 150 and the substrate 20, for instance such that the laser beam 122 impacts the substrate 20 normal to its surface 22.

Operation of the perforation system 200 will be addressed with regard to FIGS. 3A and 3D. FIG. 3A shows a plurality of row sets 30 that extend in the x dimension and that are spaced from one another in the y dimension (e.g., the plurality of row sets 30 may be disposed in parallel relation to one another). Each row set 30 may be characterized as including a plurality of rows 32 that also extend in the x dimension and that are spaced from one another in the y dimension (e.g., the plurality of rows 32 may be disposed in parallel relation to one another). Generally and as shown in FIG. 3D, the laser 120 may be activated such that its laser beam 122 impacts the surface 22 of the substrate 20 at each of the locations shown in FIG. 3D to define a plurality of perforations 12 in each row set 30, where each of these perforations 12 will ultimately have a predetermined perimeter configuration and size, and where the perforations 12 in each row set 30 are spaced from one another in any appropriate fashion (e.g., an equally spaced relation within the given row set 30).

Generally, the mirror 150 may be moved to a fixed position where the laser beam 122 will impact the surface 22 of the substrate 20 within a particular row set 30 at each of a plurality of locations that are spaced in the y dimension (depending upon from which face 134a the laser beam 122 was reflected). That is, each face 134a of the first polygon mirror 130a is associated with a different location in the y dimension shown in FIG. 3D. The laser 120 will be pulsed such that it impacts the surface 22 of the substrate 20 at predetermined locations (either along a given row 32 or between an adjacent pair of rows 32 in the corresponding row set 30 and as shown in FIG. 3D) to define a corresponding portion of each of the perforations 12 in the row set 30, and that is achieved by the laser beam 122 being reflected from a corresponding face 134a of the first polygon mirror 130a as it is being rotated at a constant rotational speed about its rotational axis 132. Again, the location of where the laser beam 122 impacts a face 134a of the first polygon mirror 130a (e.g., where the laser beam 122 impacts a face 134a along its length dimension), determines where the laser beam 122 impacts the surface 22 of the substrate 20 in the x dimension (and in the corresponding row 32 or between the corresponding pair of adjacent rows 32). Unlike the perforation system 100 of FIG. 2A, the mirror 150 of the perforation system 200 of FIG. 3A need not be incremented to different fixed positions in order for the laser beam 122 to scan each of the rows 32 of a particular row set 30 to define each of the desired perforations 12 in this row set 30 (and again where each perforation 12 has a predetermined perimeter configuration and size). Stated another way, the mirror 150 need not be moved to define the entirety of each perforation 12 in the same row set 30 on the substrate 20—the different impact locations of the laser beam 122 in the y dimension are provided by having the first polygon mirror 130a include a plurality of faces 134a that are each disposed in a different orientation relative to the rotational axis 132.

One way in which the perforations 12 shown in FIG. 3D may be produced will be summarized. The mirror 150 may be positioned such that the laser beam 122 will impact the surface 22 of the substrate 20 within the upper row set 30 in the view of FIG. 3D (location 1). With the mirror 150 remaining in this fixed position, the laser 120 may be pulsed and reflected by the various faces 134a of the rotating first polygon mirror 130 to impact the surface 22 of the substrate 20 at the locations shown in FIG. 3D (again, each face 134a of the first polygon mirror 130a will be associated with a different location within they dimension of a given row set 30). This may need to be repeated a plurality of times in order for each of the perforations 12 (within a common row set 30) to extend to the desired depth within the substrate 20 (including for a given perforation 12 to extend through the entire thickness of the substrate 20).

After all the perforations 12 in the row set 30 have been defined in accordance with the foregoing, the mirror 150 may be moved to a different fixed position where the laser beam 122 will impact the surface 22 of the substrate 20 within a different row set 30 at each of a plurality of locations that are spaced in the y dimension (depending upon from which face 134a the laser beam 122 was reflected), for instance locations 2, 3, 4, and 5 shown in FIG. 3D. This movement of the mirror 150 is shown as Dy in FIG. 3D. Although the perforation system 200 may be operated to sequence in a top-to-down fashion in the view shown in FIG. 3D, and where the entire depth of each perforation 12 in a given row set 30 may be defined prior to proceeding to the next row set 30, other operational configurations may be utilized. For instance, perforations 12 may be partially defined in each of the row sets 30, although this would require more incremental movements of the mirror 150 (e.g., ½ of the desired perforation depth for each perforation 12 in each row set 30 may be defined by a first set of incremental movements of the mirror 150, and this may then be repeated to define the remainder of the desired perforation depth for each perforation 12 in each row set 30 by repeating the noted incremental movements of the mirror 150).

A perforation system in accordance with various embodiments is illustrated in FIG. 4, is identified by reference numeral 300, and is configured/operated to form a plurality of perforations of a predetermined perimeter configuration and size on a surface 22 of a substrate 20 in accordance with the foregoing. Corresponding components between the perforation system 100 of FIG. 2A and the perforation system 300 of FIG. 4 are identified by the same reference numerals and the corresponding discussion above remains applicable to the perforation system 300 unless otherwise noted.

The perforation system 300 may be characterized as including an optical system 310. Components of this optical system 310 include the laser 120, the first polygon mirror 130, a second polygon mirror 180, and the mirror 150, and each of which may be disposed at any appropriate position along the optical path proceeding from the laser 120 to the substrate 20. The first polygon mirror 130 may be disposed between the laser 120 and the second polygon mirror 180 along the optical path of the laser beam 122 proceeding from the laser 120 to the substrate 20, and is rotated at a constant rotational velocity about its rotational axis 132. As in the case of the perforation system 100 of FIG. 2A, the first polygon mirror 130 of the perforation system 300 of FIG. 4 controls where the laser beam 122 impacts the surface 22 of the substrate 20 in the x dimension. More specifically, where the laser beam 122 impacts a given face 134 along its length dimension will determine where the laser beam 122 impacts the surface 22 of the substrate 20 in the x dimension noted in FIG. 4.

The second polygon mirror 180 may be disposed between the first polygon mirror 130 and the mirror 150 along the optical path of the laser beam 122 proceeding from the laser beam 122 to the substrate 20. Operation of the perforation system 300 may include continuously rotating the second polygon mirror 180 at a constant rotational velocity about its rotational axis 182 (e.g., an appropriate rotational drive may be interconnected with the second polygon mirror 180). A plurality of faces 184 are disposed on a perimeter of the second polygon mirror 180. Any appropriate number of faces 184 may be disposed on the perimeter of the second polygon mirror 180 (six in the illustrated embodiment). Each of these faces 184 are flat or planar surfaces in one or more embodiments. Moreover, these faces 184 are disposed parallel to the rotational axis 182 of the second polygon mirror 180 for the case of the perforation system 300 (e.g., in accord with the first polygon mirror 130 and as described above). As such, a vector that is normal to its corresponding face 184 is parallel to or colinear with the same vector of each other face 184 of the second polygon mirror 180 when disposed in the same rotational or angular position relative to the rotational axis 182.

A common included angle exists between each adjacent pair of faces 184 of the second polygon mirror 180, similar to the first polygon mirror 130 discussed above. Although adjacent faces 184 may intersect along a line, any appropriate transition may be used between each adjacent pair of faces 184 (e.g., a chamfer; a rounded or convex transition surface). Where the laser beam 122 impacts a given face 184 between its corresponding pair of ends 186 (and that may be referred to as defining a length dimension of such a face 184) will at least in part determine where the laser beam 122 impacts the surface 22 of the substrate 20 in the y dimension noted in FIG. 4.

The orientation of the rotational axis 132 for the first polygon mirror 130 is different than the orientation of the rotational axis 182 for the second polygon mirror 180. The rotational axis 132 of the first polygon mirror 130 is orientated to control where the laser beam 122 impacts the surface 22 of the substrate 20 in the x dimension noted in FIG. 4. In contrast, the rotational axis 182 of the second polygon mirror 180 is orientated to control where the laser beam 122 impacts the surface 22 of the substrate 20 in the y dimension noted in FIG. 4. For the case where the number of faces 134 used by first polygon mirror 130 is the same as the number of faces 184 used by the second polygon mirror 180, the first polygon mirror 130 may be rotated at a different rate than the second polygon mirror 180, including where the first polygon mirror 130 is rotated at a higher rotational speed than the second polygon mirror 180 (although both polygon mirrors 130, 180 will typically each be rotated at a constant rotational speed). The first polygon mirror 130 and the second polygon mirror 180 could be rotated at a common rotational speed if the number of faces 134 for the first polygon mirror 130 differed from the number of faces 184 for the second polygon mirror 180.

The mirror 150 may be disposed between the second polygon mirror 180 and the substrate 20 along the optical path of the laser beam 122 proceeding from the laser 120 to the substrate 20. The position of the mirror 150 is again controlled by the drive 160 that rotates the mirror 150 about its rotational axis 152. Generally, the position of the mirror 150 controls in part where the laser beam 122 impacts the surface 22 of the substrate 20 in the y dimension noted on FIG. 4 (again, the rotating second polygon mirror 180 also controls in part where the laser beam 122 impacts the surface 22 of the substrate 20 in the y dimension noted on FIG. 4). One or more other optical components may be located along the optical path between the mirror 150 and the substrate 20, for instance such that the laser beam 122 impacts the substrate 20 normal to its surface 22.

Operation of the perforation system 300 of FIG. 4 is at least somewhat functionally similar to what is shown and described above in relation to FIG. 3D and the perforation system 200. FIG. 4 shows a plurality of row sets 30 that each extend in the x dimension and that are spaced from one another in the y dimension (e.g., the plurality of row sets 30 may be disposed in parallel relation to one another). Each row set 30 includes a plurality of rows 32 (see FIG. 3D) that also extend in the x dimension and that are spaced from one another in the y dimension (e.g., the plurality of rows in a given row set 30 may be disposed in parallel relation to one another). Generally and as shown in FIG. 4, the laser 120 may be activated such that its laser beam 122 impacts the surface 22 of the substrate 20 at each of the locations shown in FIG. 3D to define a plurality of perforations 12 in a given row set 30, where each of these perforations 12 will ultimately have a predetermined perimeter configuration and size, and where the perforations 12 in a given row set 30 are spaced from one another in any appropriate fashion (e.g., an equally spaced relation within the given row set 30). Each of the row sets 30 are separately scanned by the laser 120 in the case of the perforation system 300 of FIG. 4.

Generally, the mirror 150 in the case of the perforation system 300 of FIG. 4 may be moved to a fixed position where the laser beam 122 will impact the surface 22 of the substrate 20 within a particular row set 30 at each of a plurality of locations that are spaced in the y dimension (via the rotating second polygon mirror 180). Within this row set 30, where the laser beam 122 will impact the surface 22 of the substrate 20 in the y dimension will depend upon where the laser beam 122 impacts a face 184 of the second polygon mirror 180 along its length dimension. The laser 120 will further be pulsed such that it impacts the surface 22 of the substrate 20 at predetermined locations in the x dimension (either along a given row or between an adjacent pair of rows of a corresponding row set 30) to define a corresponding portion of each of the perforations 12 in the row set 30, and that is achieved by the laser beam 122 being reflected from a corresponding face 134 of the first polygon mirror 130 as it is being rotated at a constant rotational speed about its rotational axis 132. Again, the location of where the laser beam 122 impacts a face 134 of the first polygon mirror 130 (e.g., where the laser beam 122 impacts a face 134 along its length dimension), determines where the laser beam 122 impacts the surface 22 of the substrate 20 in the x dimension (and in the corresponding row or between the corresponding pair of adjacent rows of the current row set 30). Unlike the perforation system 100 of FIG. 2A, the mirror 150 of the perforation system 300 of FIG. 4 need not be incremented to different fixed positions in order for the laser beam 122 to scan each of the rows of a particular row set 30 to define each of the desired perforations 12 in this row set 30 (and again where each perforation 12 will ultimately have a predetermined perimeter configuration and size). This capacity for different locations in the y dimension within a particular row set 30 is provided by the rotating second polygon mirror 180.

One way in which the perforations 12 shown in FIG. 3D may be produced by the perforation system 300 of FIG. 4 will be summarized. The mirror 150 may be positioned such that the laser beam 122 will impact the surface 22 of the substrate 20 within the upper row set 30 in the view of FIG. 3D (i.e., location 1). With the mirror 150 remaining in this fixed position, the laser 120 may be pulsed and its laser beam 122 reflected by one or more faces 134 of the rotating first polygon mirror 130 (to have the laser beam 122 impact the surface 22 of the substrate 20 at a particular location in the x dimension in the row set 30) and the laser beam 122 will also be reflected by one or more faces 184 of the rotating second polygon mirror 180 (to have the laser beam 122 impact the surface 22 of the substrate 20 at a particular location in the y dimension in the row set 30). This may need to be repeated a plurality of times in order for each of the perforations 12 (within a common row set 30—FIG. 3D) to extend to the desired depth within the substrate 20 (including for a given perforation 12 to extend through the entire thickness of the substrate 20).

After all the perforations 12 in the noted row set 30 have been defined in accordance with the foregoing via operation of the perforation system 300 of FIG. 4, the mirror 150 may be moved to a different fixed position (one of locations 2, 3, 4, and 5 shown in FIG. 3D) for repetition in accordance with the foregoing. This movement of the mirror 150 is shown as Dy in FIG. 3D. Although the perforation system 300 of FIG. 4 may be operated to scan or sequence in a top-to-down fashion in the view shown in FIG. 3D, and where the entire depth of each perforation 12 in a given row set 30 is defined prior to proceeding to the next row set 30, other operational configurations may be utilized. For instance, perforations 12 may be partially defined in each of the row sets 30, although this would require more incremental movements of the mirror 150 (e.g., ½ of the desired perforation depth for each perforation 12 in each row set 30 may be defined by a first set of incremental movements of the mirror 150, and this may then be repeated to define the remainder of the desired perforation depth for each perforation in each row set 30 by repeating the noted incremental movements of the mirror 150). It should also be appreciated that the laser 120 may separately scan the various row sets 30 in any order (i.e., it is not required to sequence through the row sets 30 in order).

A perforation system in accordance with various embodiments is illustrated in FIG. 5, is identified by reference numeral 300a, and is configured/operated to form a plurality of perforations of a predetermined perimeter configuration and size on a surface 22 of a substrate 20 in accordance with the foregoing. The perforation system 300a uses the same components as the perforation system 300 of FIG. 4. However, the perforation system 300a of FIG. 5 is operated differently than the perforation system 300 of FIG. 4 to form a plurality of perforations of a predetermined perimeter configuration and size on a surface 22 of a substrate 20 in accordance with the foregoing. In the case of the perforation system 300a, the second polygon mirror 180 may be rotating at a higher rotational speed than in the case of the perforation system 300 of FIG. 4. One or more other optical components may be located along the optical path between the mirror 150 and the substrate 20, for instance such that the laser beam 122 impacts the substrate 20 normal to its surface 22.

Operation of the perforation system 300a of FIG. 5 again will be described in relation to FIG. 3D. Generally and for a single fixed position of the mirror 150, the laser beam 122 from the laser 120 will be scanned to impact various locations in multiple row sets 30 (e.g., FIG. 3D). For instance and again for a single fixed position of the mirror 150, the laser beam 122 from the laser 120 may be scanned to impact various locations in each of the row sets 30 shown in FIG. 3D (e.g., scanning from top to bottom in the view shown in FIG. 3D for a single, fixed position of the mirror 150). This scan may need to be repeated a plurality of times in order for the corresponding portions of the perforations 12 (again, within each of multiple row sets 30) to extend to the desired depth within the substrate 20 (including for a given corresponding portion of each perforation 12 to extend through the entire thickness of the substrate 20). The location from which the laser beam 122 is reflected by a face 134 of the first polygon mirror 130 will determine the location in the x dimension where the laser beam 122 will impact the surface 22 of the substrate 20, whereas the location from which the laser beam 122 is reflected by a face 184 of the second polygon mirror 130 will determine the location in the y dimension where the laser beam 122 will impact the surface 22 of the substrate 20, all for a given fixed position of the mirror 150.

The foregoing is repeated for each of a plurality of different positions of the mirror 150, where each different position of the mirror will change the y dimension of the area of the substrate 20 that is scanned in accordance with the foregoing (see representative different positions a, b, and c in FIG. 5A). After the above-noted scanning has been repeated for each of certain number of different positions of the mirror 150, this will ultimately define a plurality of perforations 12 in the substrate 20, and where each such perforation 12 has a predetermined perimeter configuration and size.

Figure 7A:
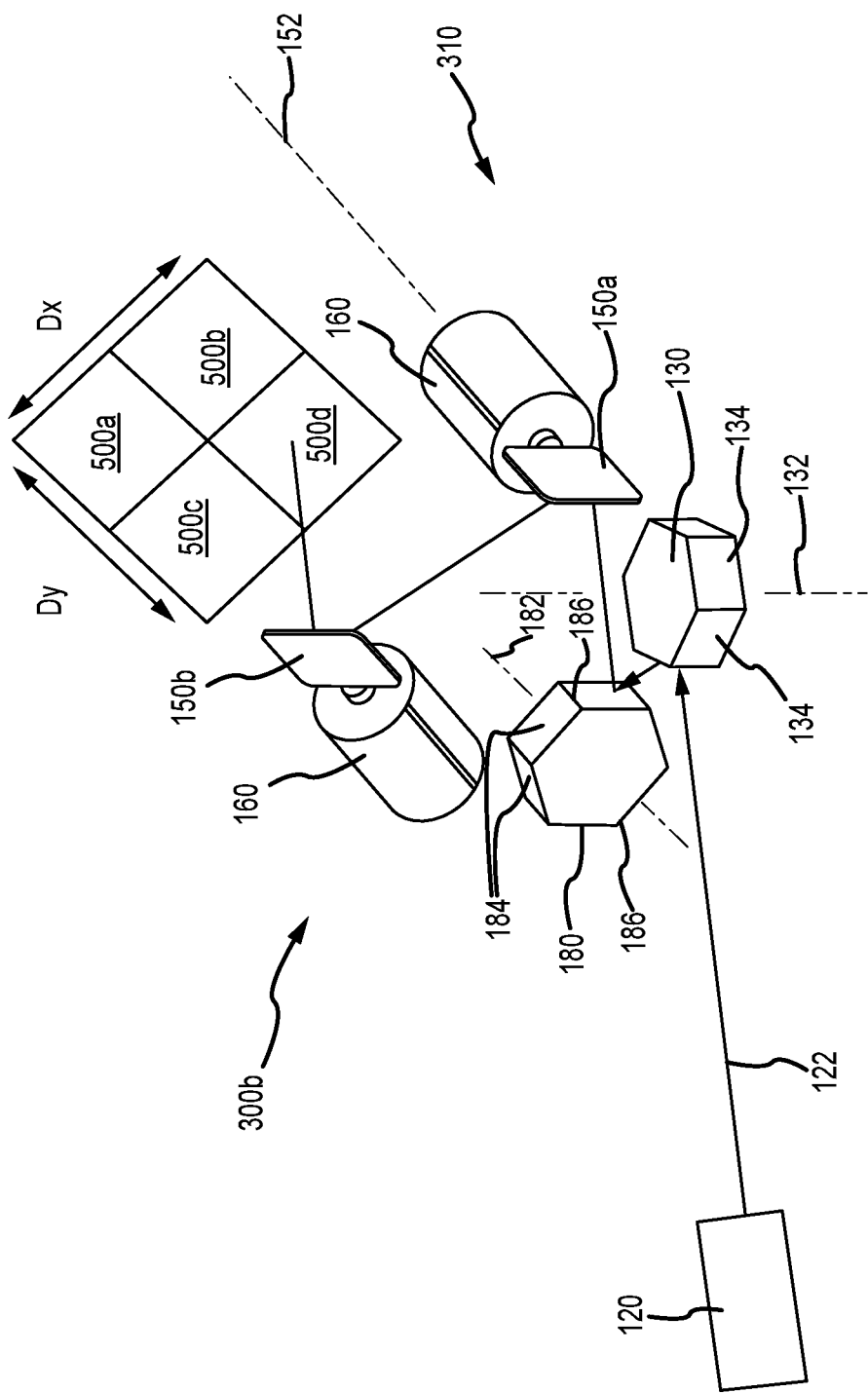
FIG. 7A illustrates a perforation system that utilizes a first polygon mirror, a second polygon mirror, a first positioning mirror, and a second positioning mirror that accommodates formation of perforations in each of a number of different quadrants.

A perforation system accordance with various embodiments is illustrated in FIG. 7A, is identified by reference numeral 300b, and is configured/operated to form a plurality of perforations (e.g., perforations 12—FIG. 7B) of a predetermined perimeter configuration and size on a surface of a substrate (e.g., substrate 20—FIG. 7B) in accordance with the foregoing. The perforation system 300b includes the first polygon mirror 130 and the second polygon mirror 180 in accordance with the perforation systems 300, 300a. The perforation system 300b further includes a first positioning mirror 150a (e.g., in accordance with the mirror 150 discussed above in relation to the perforation systems 300, 300a), and a second positioning mirror 150b. The position of the second positioning mirror 150b is controlled by a drive 160 that rotates the second positioning mirror 150b about rotational axis 152b. The rotational axis 152a of the first positioning mirror 150a, and the rotational axis 152b of the second positioning mirror 150b are disposed in different orientations. The first polygon mirror 130, the second polygon mirror 180, the first positioning mirror 150a, and the second positioning mirror 150b each may be disposed at any appropriate position along the optical path proceeding from the laser 120 to the substrate 20.

Figure 7B:
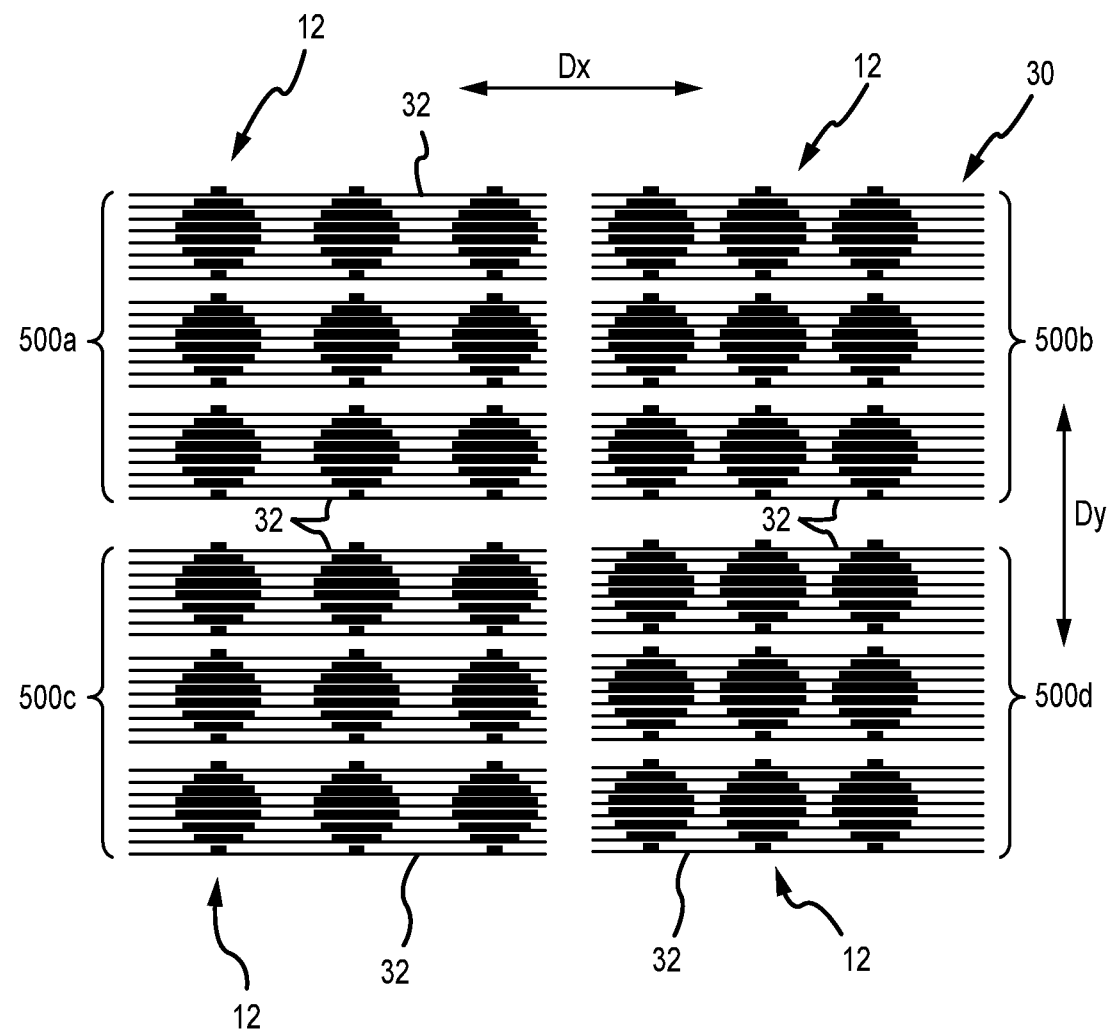
FIG. 7B is a schematic of perforations formed in different quadrants using the perforation system of FIG. 7A.

Generally, the second positioning mirror 150b may be moved/adjusted to accommodate formation of one or more perforations in different quadrants that occupy different positions in a first dimension (e.g., an x dimension). The first positioning mirror 150a may be moved/adjusted to accommodate formation of one or more perforations in different quadrants that occupy different positions in a second dimension (e.g., a y dimension) that is orthogonal to the first dimension. FIG. 7B illustrates four different quadrants 500a, 500b, 500c, and 500d. The second positioning mirror 150b provides for an adjustment in the x dimension (Dx in FIG. 7B), for instance to move from quadrant 500a to quadrant 500b, or to move from quadrant 500c to quadrant 500d. The first positioning mirror 150a provides for an adjustment in the y dimension (Dy in FIG. 7B), for instance to move from quadrant 500a to quadrant 500c, or to move from quadrant 500b to quadrant 500d.

The first polygon mirror 130, the second polygon mirror 180, and the first positioning mirror 150a furthermore may be operated to form one or more perforations 12 in each of these quadrants 500a, 500b, 500c, and 500d in accordance with the perforation system 300 or the perforation system 300b. The quadrant 500a and quadrant 500b occupy different positions in the noted first dimension, while the quadrant 500c and quadrant 500d occupy different positions in the noted first dimension. The quadrant 500a and the quadrant 500c occupy different positions in the noted second dimension, while the quadrant 500b and quadrant 500d occupy different positions in the noted second dimension.

Figure 6:
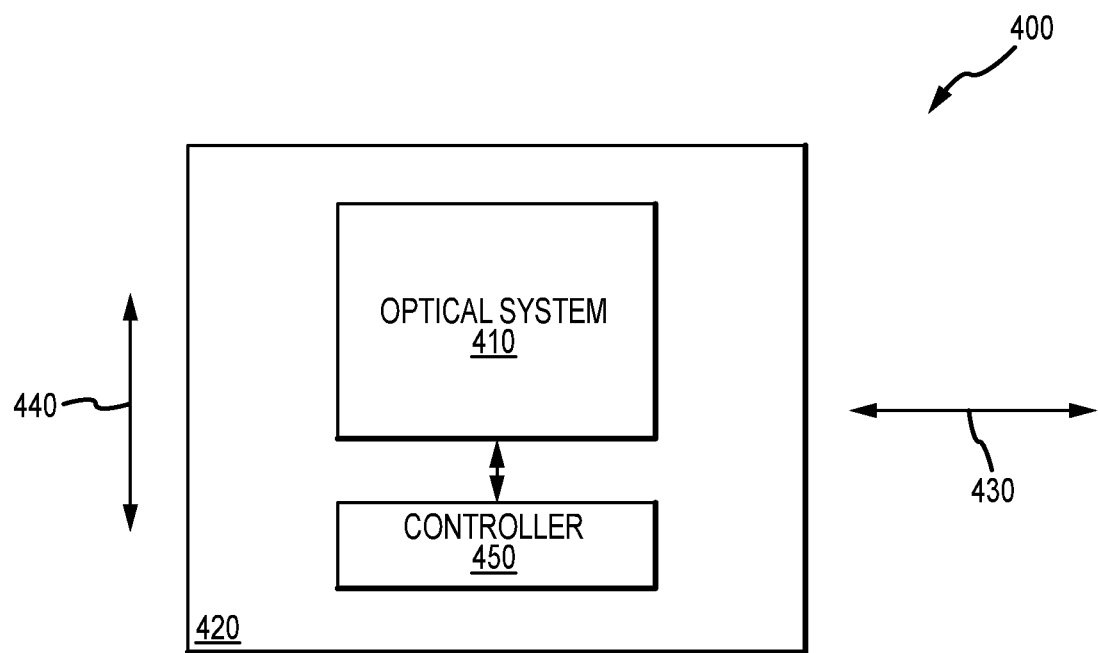
FIG. 6 is a schematic of a perforation system that may utilize an optical system, such as the optical systems shown in FIGS. 2A, 3A, 4, and 5.

The perforation systems 100, 200, 300, 300a discussed above may be used to define a plurality of perforations over an area of a substrate of any appropriate size. One way in which this may be done is in accordance with the perforation system 400 that is schematically presented in FIG. 6. The perforation system 400 includes an optical system 410, a base 420, and a controller 450. The optical system 410 may, for instance, be in accordance with any of the perforation systems 100, 200, 300, 300a discussed above. The controller 450 may be operatively interconnected with both the base 420 and the optical system 410, and may be of any appropriate configuration/architecture. For instance, the controller 450 may be operatively interconnected with the laser 120, the rotational drive source for the polygon mirrors 130/130a, 180, and the drive 160 for the mirror 150. The base 420 may be moved in each of an x dimension 430 and a y dimension 440 such that after the optical system 410 has formed perforations on one section of a substrate, the base 420 may be moved such that the optical system 410 may thereafter form perforations on a completely different section of the same substrate. This may be done any appropriate number of times.

The above-discussed perforation system 100, 200, 300, and 300a are believed to significantly reduce the amount of time to form a plurality of perforations compared to a standard two galvanometer mirror system. The advantage becomes more and more relevant as the size of the surface on which perforations are formed increases and when forming at least a certain number of perforations.

The foregoing description has been presented for purposes of illustration and description. Furthermore, the description is not intended to be limited to the form disclosed herein. Consequently, variations and modifications commensurate with the above teachings, and skill and knowledge of the relevant art, are within the scope of this disclosure. Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed:

1. A method for creating a perforation in a substrate, comprising:
   directing a laser beam from a laser;
   rotating a first polygon mirror comprising a plurality of faces that are disposed on a perimeter of said first polygon mirror;
   reflecting said laser beam from a face of said plurality of faces;
   removing material from a substrate, after said reflecting step, by impacting said laser beam on said substrate;
   repeating said reflecting and removing steps a plurality of times to define a first perforation in said substrate;
   defining a first plurality of perforations on said substrate using said repeating step, wherein each perforation of said first plurality of perforations is spaced from a remainder of said first plurality of perforations, and wherein said first plurality of perforations comprises said first perforation;
   wherein an optical system comprises said first polygon mirror and said laser, wherein said optical system is in a first position for said defining a first plurality of perforations step, said method further comprising:
   moving an entirety of said optical system from said first position to a second position; and
   defining a second plurality of perforations on said substrate using said repeating step, wherein each perforation of said second plurality of perforations is spaced from a remainder of said second plurality of perforations, wherein said first plurality of perforations and said second plurality of perforations are defined in non-overlapping portions of said substrate, and wherein said optical system is in said second position for said defining a second plurality of perforations step.

2. The method of claim 1, wherein multiple executions of said reflecting and removing steps are required to define both a desired depth of said first perforation and a desired perimeter configuration of said first perforation.

3. The method of claim 1, wherein a movable mirror and said first polygon mirror are in an optical path proceeding from said laser to said substrate, wherein said first polygon mirror defines a plurality of said first perforations in at least a first dimension and said movable mirror defines at least part of at least some of said plurality of said first perforations in a second dimension that is orthogonal to said first dimension.

4. The method of claim 1, wherein each said face of said plurality of faces is a planar surface and is parallel to a rotational axis of said first polygon mirror.

5. The method of claim 4, further comprising:
   executing a first repeating step comprising repeating said reflecting and removing steps a plurality of times at spaced locations in each of a first plurality of rows that each correspond with an x dimension of said substrate, wherein each row of said first plurality of rows are spaced from one another in a y dimension of said substrate, wherein said first plurality of rows define a first row set, and wherein a plurality of said first perforations are defined in said first row set and are spaced from one another along said first row set.

6. The method of claim 5, further comprising incrementally moving a first mirror between a first plurality of fixed positions, wherein each fixed position of said first plurality of fixed positions corresponds with a different said row of said first row set.

7. The method of claim 1, wherein each said face of said plurality of faces is a planar surface and is disposed at a different angle relative to a rotational axis of said first polygon mirror.

8. The method of claim 7, further comprising maintaining a first mirror in a first fixed position until completion of said first perforation, wherein said first mirror is disposed between said laser and said first polygon mirror in an optical path proceeding from said laser to said substrate.

9. The method of claim 8, further comprising:
incrementing said first mirror to a second fixed position; and
repeating said reflecting and removing steps a plurality of times to define a second perforation in said substrate and with said first mirror remaining in said second fixed position, wherein said first and second perforations are spaced from one another in a y dimension of said substrate.

10. The method of claim 1, further comprising the steps of:
rotating a second polygon mirror comprising a plurality of faces that are disposed on a perimeter of said second polygon mirror;
wherein said first polygon mirror comprises a first rotational axis, wherein said second polygon mirror comprises a second rotational axis, and wherein said first rotational axis is disposed in a different orientation than said second rotational axis.

11. The method of claim 10, wherein said first polygon mirror is used to define an extent of said first perforation in an x dimension of said substrate, and wherein said second polygon mirror is used to define an extent of said first perforation in a y dimension of said substrate.

12. The method of claim 10, wherein said repeating step comprises impacting said laser beam on each of a plurality of different locations within each row of each row set of a plurality of row sets, said method further comprising:
defining a plurality of said first perforations in each said row set using said repeating step.

13. The method of claim 12, wherein all of said plurality of first perforations in a given said row set are defined prior to initiating execution of said defining step in a different said row set.

14. The method of claim 12, wherein said defining a plurality of said first perforations comprises:
a first sequencing step comprising sequencing said laser beam a single time through each said row set of said plurality of row sets to impact a first plurality of different locations within each said row set; and
executing a second sequencing step after said first sequencing step, and comprising sequencing said laser beam a single time through each said row set of said plurality of row sets to impact a second plurality of different locations within each said row set.

15. A perforation system, comprising:
a movable base;
a laser mounted in a fixed position on said movable base;
a first polygon mirror rotatably mounted on said movable base; and
a controller configured:
to dispose said movable base in a plurality of fixed positions; and
to operate said laser and to rotate said first polygon mirror at a fixed rotational speed to define a plurality of perforations throughout a predetermined area of a substrate for each of said plurality of fixed positions of said movable base.

16. The perforation system of claim 15, further comprising a first mirror mounted on said movable base.

17. The perforation system of claim 15, further comprising:
a second polygon mirror rotatably mounted on said movable base and a first mirror movably mounted on said movable base.

18. The perforation system of claim 17, wherein said first polygon mirror is disposed between said laser and said second polygon mirror along an optical path.

19. A method for creating a perforation in a substrate, comprising:
directing a laser beam from a laser;
rotating a first polygon mirror comprising a plurality of faces that are disposed on a perimeter of said first polygon mirror, wherein each said face of said plurality of faces is a planar surface and is disposed at a different angle relative to a rotational axis of said first polygon mirror;
reflecting said laser beam from a face of said plurality of faces;
removing material from a substrate, after said reflecting step, by impacting said laser beam on said substrate;
repeating said reflecting and removing steps a plurality of times to define a first perforation in said substrate; and
maintaining a first mirror in a first fixed position until completion of said first perforation, wherein said first mirror is disposed between said laser and said first polygon mirror in an optical path proceeding from said laser to said substrate.

20. The method of claim 19, further comprising:
incrementing said first mirror to a second fixed position; and
repeating said reflecting and removing steps a plurality of times to define a second perforation in said substrate and with said first mirror remaining in said second fixed position, wherein said first and second perforations are spaced from one another in a y dimension of said substrate.

* * * * *